United States Patent [19]
Kasamatsu et al.

[11] Patent Number: 6,095,644
[45] Date of Patent: *Aug. 1, 2000

[54] INK-JET PRINTING APPARATUS

[75] Inventors: Takehiko Kasamatsu, Fujisawa; Shinji Takagi, Kawasaki; Hideki Tanaka, Yokohama; Hiroyuki Hyotani, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/598,810

[22] Filed: Feb. 9, 1996

[30] Foreign Application Priority Data

Feb. 13, 1995 [JP] Japan ................................. 7-023574
Feb. 7, 1996 [JP] Japan ................................. 8-021265

[51] Int. Cl.⁷ ...................................................... B41J 2/01
[52] U.S. Cl. ........................................................ 347/101
[58] Field of Search ............................ 347/101, 96, 100, 347/105

[56] References Cited

U.S. PATENT DOCUMENTS

| | | | |
|---|---|---|---|
| 4,313,124 | 1/1982 | Hara | 346/140 R |
| 4,313,684 | 2/1982 | Tazaki et al. | 400/322 |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,576,867 | 3/1986 | Miyamoto | 428/342 |
| 4,608,577 | 8/1986 | Hori | 346/140 R |
| 4,694,302 | 9/1987 | Hackleman et al. | 346/1.1 |
| 4,723,129 | 2/1988 | Endo et al. | 346/1.1 |
| 4,740,796 | 4/1988 | Endo et al. | 346/1.1 |
| 4,836,852 | 6/1989 | Knirsch et al. | 106/22 |
| 5,172,134 | 12/1992 | Kishida et al. | 347/9 |
| 5,555,008 | 9/1996 | Stoffel et al. | 347/100 |
| 5,635,969 | 6/1997 | Allen | 347/96 |

FOREIGN PATENT DOCUMENTS

| | | |
|---|---|---|
| 0608105 | 7/1994 | European Pat. Off. . |
| 0623473 | 11/1994 | European Pat. Off. . |
| 54-056847 | 5/1979 | Japan . |
| 58-128862 | 8/1983 | Japan . |
| 59-123670 | 7/1984 | Japan . |
| 59-138461 | 8/1984 | Japan . |
| 60-071260 | 4/1985 | Japan . |
| 299971 | 7/1988 | Japan . |
| 64-063185 | 3/1989 | Japan . |
| 5202328 | 8/1993 | Japan . |
| WO 8703363 | 6/1987 | WIPO . |

*Primary Examiner*—John Barlow
*Assistant Examiner*—Charles W. Stewart, Jr.
*Attorney, Agent, or Firm*—Fitzpatrick, Cella, Harper & Scinto

[57] ABSTRACT

An ink-jet printing apparatus performs a printing process by discharging ink from color ink heads and treatment liquid from a liquid head for making the ink insoluble or coherent. The printing apparatus has the minimum amount of memory required to eject the treatment liquid as far as possible and performs excellent printing. For discharge data of one scanning performance of the color ink heads, the apparatus has only memories for each color ink head. Discharge data for the treatment liquid is formed by a treatment liquid discharge data creating portion based on the data stored in the memories upon switched by data-switching portion. Then the discharge data for the liquid head is supplied to the head after being stored in a buffer as much as the number of orifices of the head.

18 Claims, 23 Drawing Sheets

INK-JET PRINTING APPARATUS

BACKGROUND OF THE INVENTION

1. Field of the Invention

The present invention relates to an ink-jet printing apparatus, in particular to an ink-jet printing apparatus that performs a printing process by discharging ink and a treatment solution or liquid for making dye stuff of the ink insoluble or coherent.

2. Description of the Prior Art

An ink-jet printing method has been widely applied in printers and the like because it has many advantages of quiet printing, less running costs, size reduction, and printing in colors, and so on, without great difficulty.

Previously, if an image is printed on a printing medium such as a piece of ordinary paper by the ink-jet printing method it often happens that the quality of the image declines in consequence of spreading ink on the paper, or the like. In general, ink to be used in the ink-jet printing method is mainly composed of water, so that the ink runs on the paper. In the case of printing a color image, in particular, several color inks are stacked one after another on the printing medium without intervals enough to fix each color. As a result, bleedings can occur on a boundary between the colors and it often lowers the quality of the image. Furthermore, there are some printed matters obtained by the ink-jet printing method where ink does not show sufficient water-proof characteristics.

To solve the above problems on the ink-jet printing method, for example, Japanese Patent Application Laying-open No. 128862/1983 discloses a technique of discharging a treatment solution having an effect of fixing recording ink on a recording medium so as to place them one on top of the other before or after discharging the recording ink. In this document, there is described the method of generating data for discharging the above treatment solution, in which the discharge data is provided as a result of performing a logical OR with respect to the discharge data of cyan, magenta, and yellow.

Japanese Patent Application Laying-open No. 63185/1989 also discloses a technique of improving a waterproof property of ink. In this document, when a recording ink is attached on a recording medium after attaching a chemical compound that makes dye stuff of ink insoluble, printing is performed after setting a dot of the insolublizing compound so as to have a larger diameter than that of the recording ink.

Furthermore, Japanese Patent Application Laying-open No. 202328/1993, disclosing the same kind of technology, includes a description of improving the property of waterproof and the stability of fixation by using:

a method of discharging treatment solution on a printing medium prior to the ink-jet, in which the treatment solution is responsible for fixing the recording ink well to provide a waterproof property thereof;

a method of attaching the treatment solution on the recording medium by a roller coating; and a method of attaching the recording ink and the treatment solution on the recording medium after mixing them by an injection device during their flying in the air.

As explained in the above three official documents, careful handling of the discharge data becomes a subject of the discussion in the technology of making the ink insoluble and flocculating dye stuff in the ink by discharging the treatment solution from a different head and mixing it with the ink. Among the above official documents, for example, Japanese Patent Application Laying-open No. 128862/1983 employs a logical OR of the discharge data of Y, M, and C as the way of generating data for discharging the treatment solution, as mentioned above. If a plurality of discharge orifices are formed on a head of each ink (typically this kind of construction is employed in most cases), the number of logical circuits and their incidental delay circuits and the like are required as much as the number of the orifices, causing a problem of constructing a comparatively complicated and large-scaled circuit structure. This problem is more serious in a printing apparatus using a so-called full line head.

To solve the above problem, for example, it is conceivable that discharge data of the treatment solution is previously formed for one line with respect to a scanning movement of the head and then the data of one line is stored in an exclusive memory from which the discharge data is read out every time the head discharges.

However, the memory has not been required when the treatment solution has not been used, thus resulting in a different problem of raising the cost of manufacturing the device. This problem becomes more remarkable in proportion to the amount of the discharge data depending on the number of orifices of the head and the extent of the printing area.

SUMMARY OF THE INVENTION

Therefore the present invention is conceived so as to solve the above problems. An object of the present invention is to provide an ink-jet printing apparatus which is able to provide excellent results in printing with the amount of memory being kept as small as possible, in particular, by discharging a predetermined amount of treatment solution from a head having a plurality of orifices.

In a first aspect of the present invention, there is provided an ink-jet printing apparatus adapted to perform a printing process by discharging ink from an ink discharge portion and discharging liquid that includes at least a substance making coloring material in the ink insoluble or coherent from a liquid discharge portion onto a printing medium, which apparatus comprises:

a discharge data memory for storing a predetermined amount of discharge data for the ink-discharge portion;

discharge data former for forming discharge data of the liquid based on the discharge data stored in the discharge data memory, an amount of the discharge data of the liquid formed being less than the predetermined amount of the discharge data stored in the discharge data memory;

a liquid discharge buffer for storing the discharge data of the liquid formed by the discharge data former; and controller for driving the ink discharge portion to discharge ink and the liquid discharge portion to discharge the liquid according to the discharge data stored in the liquid discharge buffer and the discharge data memory, respectively.

Here, the controller may comprise:

an ink discharge buffer for storing discharge data corresponding to a less amount of the discharge data than the predetermined amount for the ink-discharge portion; and a data-transfer switch circuit for switching a transmission of the discharge data stored in the discharge data memory to the discharge data former and the ink discharge buffer.

The amount of the discharge data of the liquid formed in the discharge data former, which is less than the predetermined amount of the discharge data stored in the discharge data memory, may correspond to the number of orifices of the liquid discharge portion and the ink discharge portion.

The controller may further comprise:

a resolution converting circuit for converting a resolution of the discharge data to be transmitted to the ink-discharge buffer.

The resolution converting circuit may perform a conversion by which a resolution of the discharge data is increased.

The ink-jet printing apparatus may further comprise:

a data-amplification circuit for increasing the amount of the discharge data formed by the discharge data former and transmitting the increased discharge data to the liquid discharge buffer.

The liquid may comprise cationic substances of a low-molecular weight ingredient and a high-molecular weight ingredient, while the ink comprises an anionic dye stuff.

The liquid may comprise cationic substances of a low-molecular weight ingredient and a high-molecular weight ingredient, while the ink comprises an anionic compound and a pigment.

The ink discharge portion and the liquid discharge portion may have a thermal energy generating element for discharging the ink or the liquid by utilizing thermal energy.

In a second aspect of the present invention, there is provided an ink-jet printing apparatus adapted to perform a printing process by discharging ink on a printing medium from a plurality of color ink discharge heads and discharging liquid having at least a substance which makes coloring material in the ink insoluble or coherent from at least one liquid discharge head, which apparatus comprises:

a plurality of discharge data memory portions for storing a predetermined amount of discharge data for the plurality of the color ink discharge heads, respectively;

discharge data former for forming discharge for the liquid discharge head based on the predetermined amount of discharge data stored in the plurality of discharge data memory portions, the discharge data formed for the liquid discharge head corresponding to a less amount than the predetermined amount of the discharge data;

a liquid discharge buffer for storing the discharge data for the liquid discharge portion formed by the discharge data former;

a plurality of color ink discharge buffers for storing discharge data for each of the plurality of color ink discharge heads, respectively, each of the discharge data stored in the color ink discharge buffer corresponding to a less amount than the predetermined amount of the discharge data;

a data-transfer switch for switching a transmission of the discharge data stored in the plurality of discharge data memory portions to the discharge data former and the respective plurality of the color ink discharge buffers; and controller for driving the at least one liquid discharge portion and the plurality of color ink discharge portions according to the discharge data stored in the liquid discharge buffer and the plurality of color ink discharge buffers, respectively.

Here, the data transfer switch may switch the transmission every discharge timing.

The discharge data former may form discharge data of the treatment liquid by performing a logical OR of the discharge data stored in the plurality of the discharge data memory portions every discharge timing.

The printing apparatus may be constructed to be used as a terminal for a computer.

The printing apparatus may be constructed to be used in a copying machine.

The printing apparatus may be constructed to be used in a facsimile machine.

According to the above construction, for example, a predetermined amount of ink discharge data for one scanning movement is stored in a discharge data memory. On the other hand, discharge data of the treatment solution is formed based on the ink discharge data above and stored in a buffer as much as the number of the orifices in response to discharge timing of the head for discharging the solution. Consequently, the amount of memory for storing the discharge data of the treatment solution can be kept to a minimum as far as possible.

DETAILED DESCRIPTION OF PREFERRED EMBODIMENT

Hereinafter, embodiments of the present invention will be explained in detail with reference to the attached drawings.

<First Embodiment>

Figure 1:
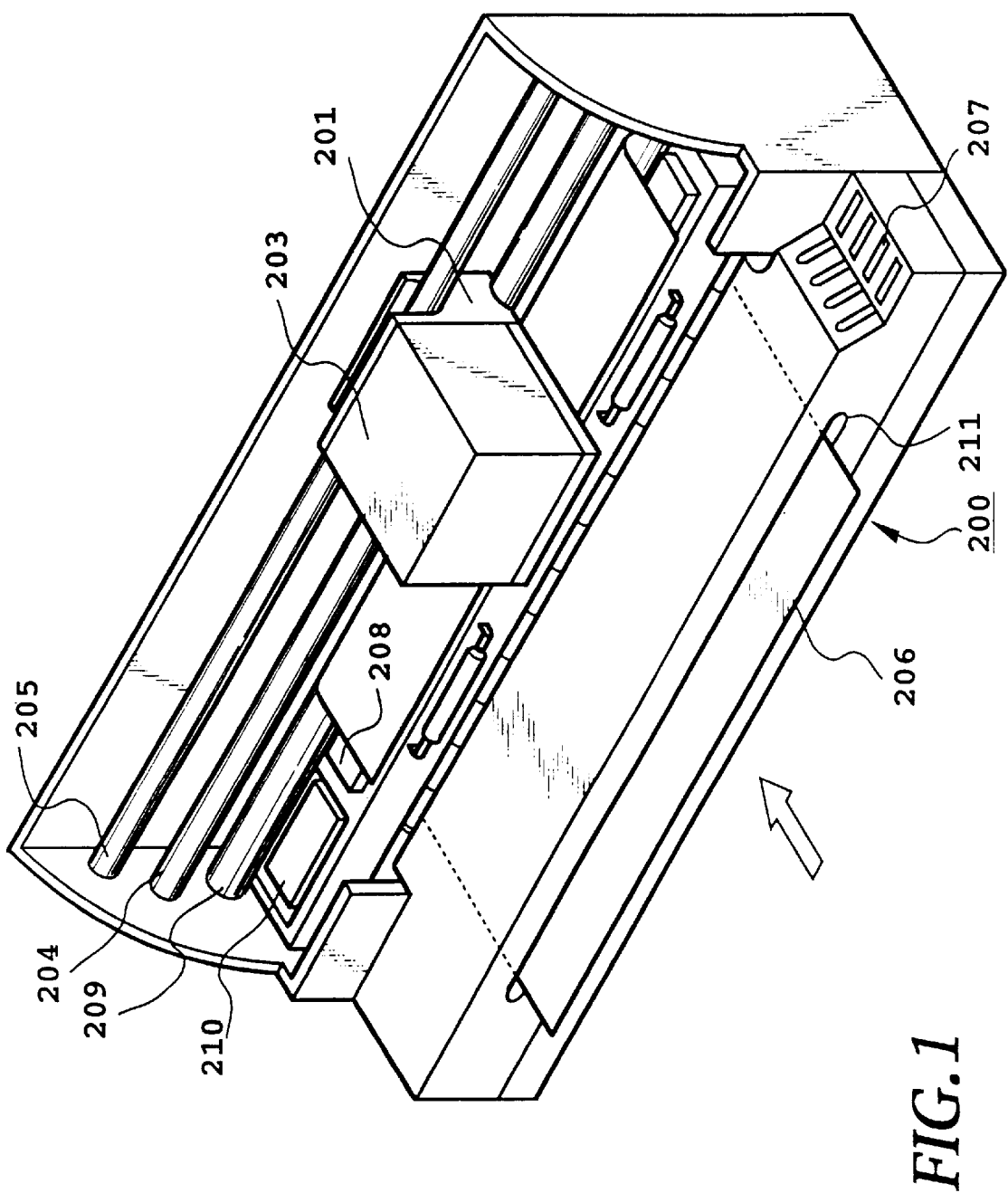
FIG. 1 is a perspective view of an ink-jet printing apparatus in accordance with an embodiment of the present invention.

FIG. 1 is a perspective illustration of an ink-jet printing apparatus as one of embodiments of the present invention.

In ink-jet printing apparatus 200, a carriage 201 is slidably engaged with two guide rods 204 and 205 which are extended in parallel to each other. Therefore, the carriage 201 is able to move along the guide rods 204 and 205 by a mechanism for transmitting driving power. The mechanism includes a driving motor, a belt that transmits the driving power generated by the motor, and so on (these members are not shown for clarity in the figure). In addition, the carriage 201 carries an ink-jet unit 203 having ink-jet heads and ink tanks, in which each ink tank is provided as a reservoir for storing ink to be used by the corresponding head.

To put it concretely, the ink-jet unit 203 comprises: heads for discharging ink of several colors and a treatment solution or liquid for making the ink insoluble or coherent, respectively; and tanks as containers for storing the ink or the treatment solution to be supplied to their corresponding heads. That is, the carriage 201 carries: five heads that correspond to the ink of four colors of black (Bk), cyan (C), magenta (M), and yellow (Y) and the above treatment solution respectively; and the tanks that correspond to these heads respectively, as the ink-jet unit 203. In this case, each head and its corresponding tank can be detachable from each other. If the ink or the treatment solution is used up or the like, therefore, it is possible to replace the corresponding tank alone in need of individual ink colors or the like. Needless to say, nothing but the head can be replaced with new one if required. Furthermore the heads and the tanks are not limited to the above detachable construction, but also they can be integrated together and provided as single-piece design.

Plain paper 206 as a print medium is inserted into an insertion opening 211 and then its transport direction is reversed by a paper feed movement. Finally the paper 206 is moved by a feed roller 209 to the lower part of the space where the carriage 201 shifts its position. After this, with the movement of the head carried on the carriage 201, the head prints an image on a printing region of the paper 206 sustained on a platen 208.

In this way, the head prints throughout the paper 206 with an alternate repeat of printing performance and sheet feed, in which a width or a distance of each of them corresponds to a width of an orifices' array of the head. Then the paper 206 is discharged toward the front of the apparatus.

On the left side of the possible range of the carriage's movement, when viewed from the side of the paper-insertion portion 211, there is a unit of discharge-recovering system 210. The system 210 is installed in the device so as to be able to face each head on the carriage 201 at a position below the heads. Therefore it is possible to perform the steps of capping the orifices of each head, sucking ink therefrom, and so on. In addition, the above left side includes a predetermined portion which is determined as a home position of the heads.

On the right side of the device, on the other hand, there is provided a control panel including switches and indicators. In this case, these switches are responsible for turning on/off the device's power supply, setting various modes of the printing performance, and the like, while these indicators are responsible for indicating various conditions of the device.

Figure 2:
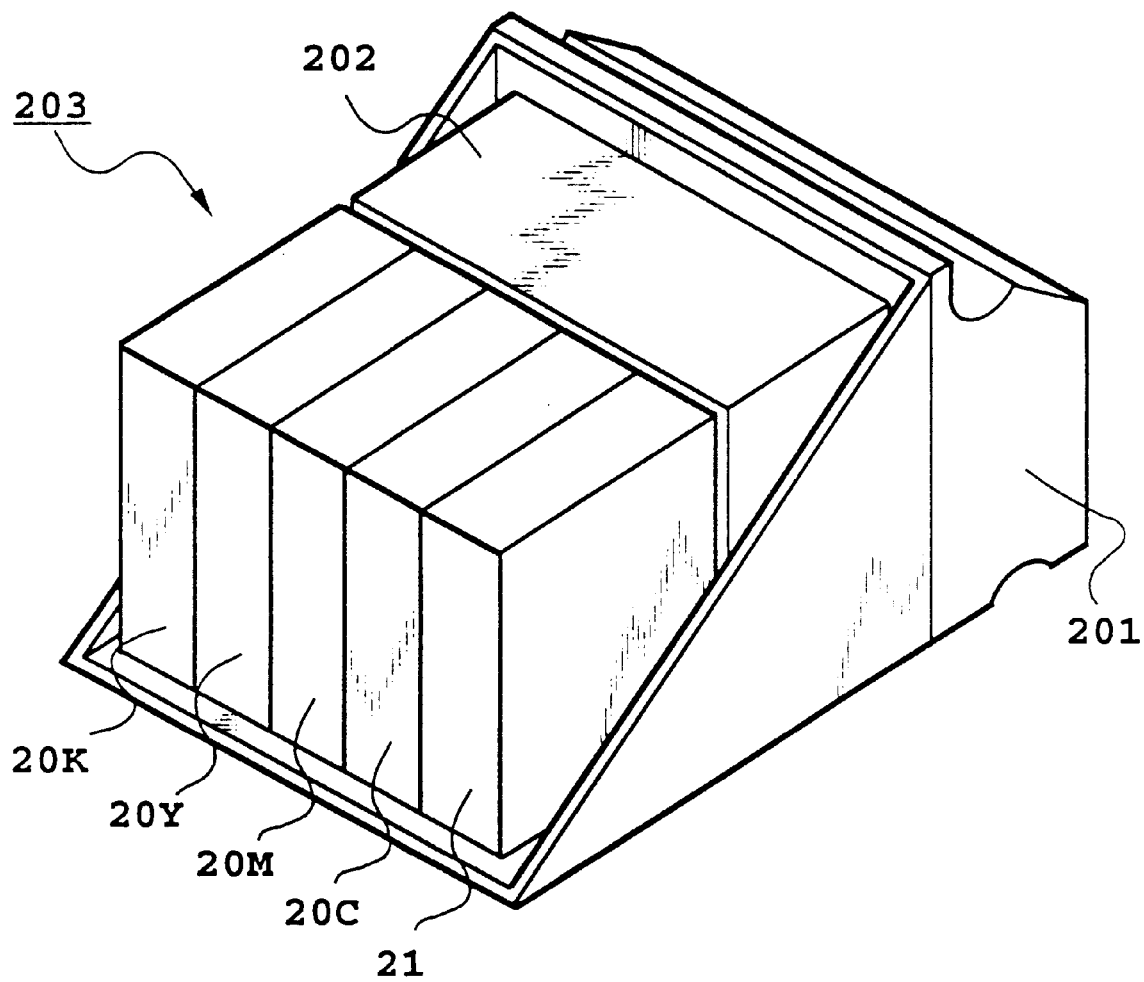
FIG. 2 is a perspective view of an ink-jet unit and a carriage to be used in the apparatus shown in FIG. 1.

Referring now to FIG. 2, there is schematically shown a perspective view of the ink-jet unit 203 illustrated in FIG. 1. In the construction of the ink-jet unit 203, as described above, each of black (Bk), cyan (C), magenta (M), and yellow (Y) ink tanks and treatment solution's tank is replaceable individually.

Figure 3:
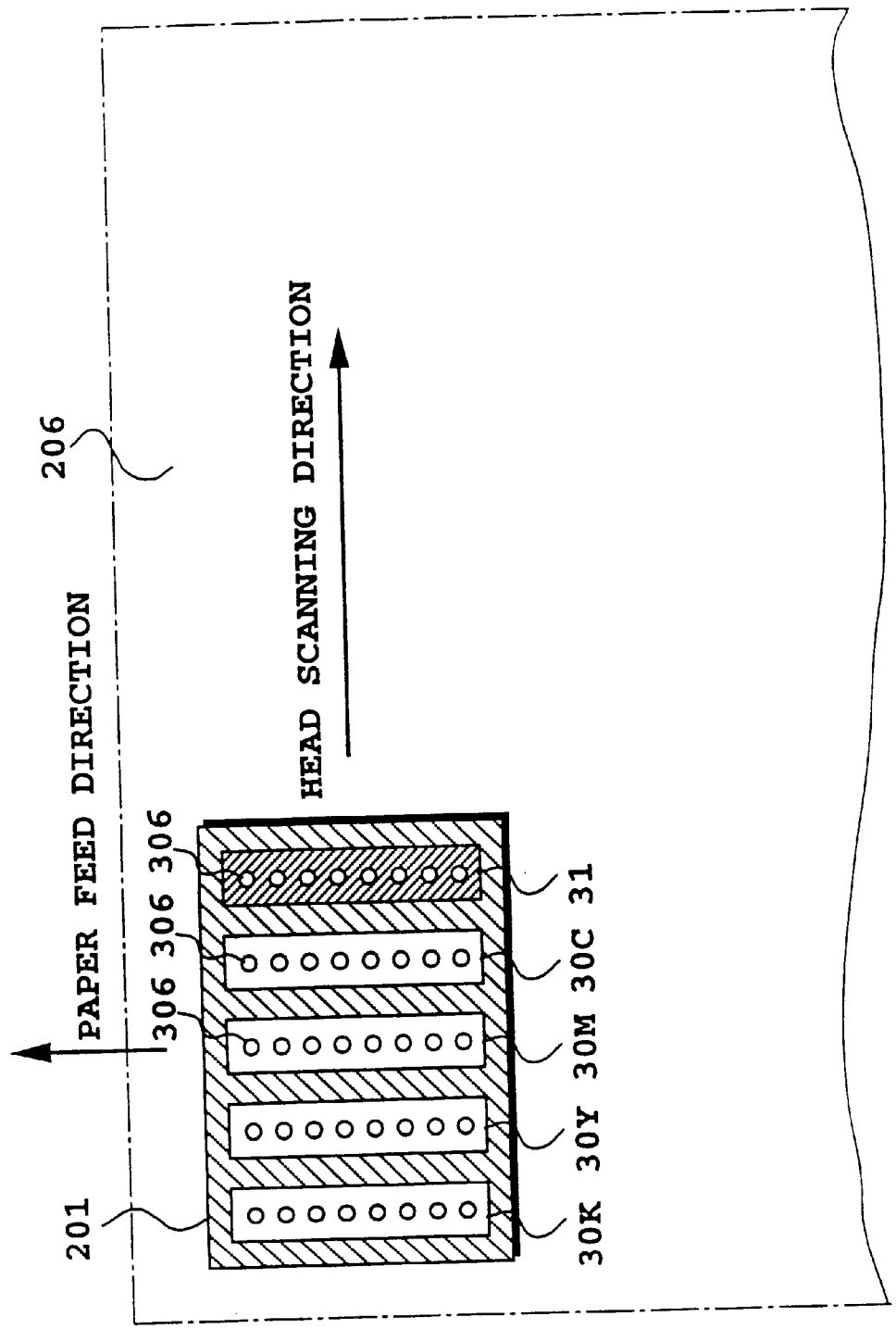
FIG. 3 is a schematic diagram of an arrangement of heads for ink of respective colors and a treatment solution in the above apparatus.

That is, the carriage 201 carries a head case 202 for removably holding each head, a Bk ink tank 20K, a Y ink tank 20Y, a M ink tank 20M, a C ink tank 20C, and a treatment solution's tank 21. In the head case 202, as shown in FIG. 3, heads 30K, 30C, 30M, and 30Y for discharging ink of Bk, C, M, and Y respectively and a head 31 for discharging the treatment solution are installed. Each head has a plurality of orifices, in which each orifice is able to eject 40 ng of ink or treatment solution at one discharge. In addition, each tank connects with its corresponding head by their joint portions (not shown) to supply the ink or the treatment solution from the tank to the head.

Furthermore, the construction of tank may be determined in accordance with the amount of usage of ink or treatment solution, so that two or more tanks may be united together, for example between the treatment solution's tank and the Bk ink tank or among the ink tanks of C, M, and Y.

Here, as an example, the treatment liquid or solution for making ink dyestuff insoluble can be obtained in the following manner.

Specifically, after the following components are mixed together and dissolved, and the mixture is pressure-filtered by using a membrane filter of 0.22 µm in pore size (tradename: fuloropore filter manufactured by Sumitomo Electric Industries, Ltd.), and thereafter, pH of the mixture is adjusted to a level of 4.8 by adding sodium hydroxide whereby liquid A1 can be obtained.

[Components of A1]

| | |
|---|---|
| low molecular weight ingredients of cationic compound: stearyl-trimethyl ammonium salts (tradename: Electrostriper QE, manufactured by Kao Corporation), or stearyl-trimethyl ammonium chloride (tradename: Yutamine 86P, manufactured by Kao Corporation) | 2.0 parts by weight |
| high molecular weight ingredients of cationic compound: copolymer of diarylamine hydrochloride and sulfur dioxide (having an average molecular weight of 5000) (tradename: polyaminesulfon PAS-92, manufactured by Nitto Boseki Co., Ltd.) | 3.0 parts by weight |
| thiodiglycol | 10 parts by weight |
| water | balance |

Preferable examples of ink which becomes insoluble by mixing the aforementioned treatment liquid can be noted below.

Specifically, the following components are mixed together, the resultant mixture is pressure-filtered with the use of a membrane filter of 0.22 µm in pore size (tradename: Fuloroporefilter, manufactured by Sumitomo Electric Industries, Ltd.) so that yellow ink Y1, magenta ink M1, cyan ink C1 and black ink K1 can be obtained.

| | |
|---|---|
| Y1 | 2 parts by weight |
| C. I. direct yellow 142 | |
| thiodiglycol | 10 parts by weight |
| acetynol EH | 0.05 parts by weight |
| (manufactured by Kawaken | |
| Fine Chemical Co., Ltd.) | |
| water | balance |

M1 having the same composition as that of Y1 other than that the dyestuff is changed to 2.5 parts by weight of C. I. acid red 289.

C1 having the same composition as that of Y1 other than that the dyestuff is changed to 2.5 parts by weight of acid blue 9.

K1 having the same composition as that of Y1 other than that the dyestuff is changed to 3 parts by weight of C. I. food black 2.

According to the present invention, the aforementioned treatment liquid and ink are mixed with each other at the position on the printing medium or at the position where they penetrate in the printing medium. As a result, the ingredient having a low molecular weight or cationic oligomer among the cationic material contained in the treatment liquid and the water soluble dye used in the ink having anionic radical are associated with each other by an ionic mutual function as a first stage of reaction whereby they are instantaneously separated from the solution liquid phase.

Next, since the associated material of the dyestuff and the cationic material having a low molecular weight or cationic oligomer are adsorbed by the ingredient having a high molecular weight contained in the treatment liquid as a second stage of reaction, a size of the aggregated material of the dyestuff caused by the association is further increased, causing the aggregated material to hardly enter fibers of the printed material. As a result, only the liquid portion separated from the solid portion permeates into the printed paper, whereby both high print quality and a quick fixing property are obtained. At the same time, the aggregated material formed by the ingredient having a low molecular weight or the cationic oligomer of the cationic material and the anionic dye by way of the aforementioned mechanism, has increased viscosity. Thus, since the aggregated material does not move as the liquid medium moves, ink dots adjacent to each other are formed by inks each having a different color at the time of forming a full colored image but they are not mixed with each other. Consequently, a malfunction such as bleeding does not occur. Furthermore, since the aggregated material is substantially water-insoluble, water resistibility of a formed image is complete. In addition, light resistibility of the formed image can be improved by the shielding effect of polymer.

By the way, the term "insoluble" or "aggregation" refers to observable events in only the above first stage or in both the first and second stages.

When the present invention is carried out, since there is no need of using the cationic material having a high molecular weight and polyvalent metallic salts like the prior art or even though there is need of using them, it is sufficient that they are assistantly used to improve an effect of the present invention, a quantity of usage of them can be minimized. As a result, the fact that there is no reduction of a property of color exhibition that is a problem in the case that an effect of water resistibility is asked for by using the conventional cationic high molecular weight material and the polyvalent metallic salts can be noted as another effect of the present invention.

With respect to a printing medium usable for carrying out the present invention, there is no specific restriction; so called plain paper such as copying paper, bond paper or the like conventionally used can preferably be used. Of course, coated paper specially prepared for ink jet printing and OHP transparent film are also preferably used. In addition, ordinary high quality paper and bright coated paper can preferably be used.

Referring now to FIG. 3, there is schematically shown the ink discharging heads 30C, 30M, 30Y, and 30K and the treatment solution's discharging head 31 of the ink-jet printing apparatus shown in FIGS. 1 and 2. In this figure, by the way, only eight orifices are illustrated in each head for the purpose of simplifying the graphical representation or the like (the orifice is referenced by numeral 306).

As described in the explanation of FIG. 1, each head is mounted on the carriage 201 together with the corresponding tank (not shown in FIG. 3) and is moved in the predetermined scanning direction. During the scanning movement, each head ejects the treatment solution or the ink and subsequently prints an image or the like on the printing medium 206. Hereinafter, a printing by one scanning movement of the head is defined as a printing of one line, and thus the device repeats the printing of one line and the sheet feed with a distance corresponding to a width of the one line printing alternately in order to print throughout the print medium 206.

Figure 4:
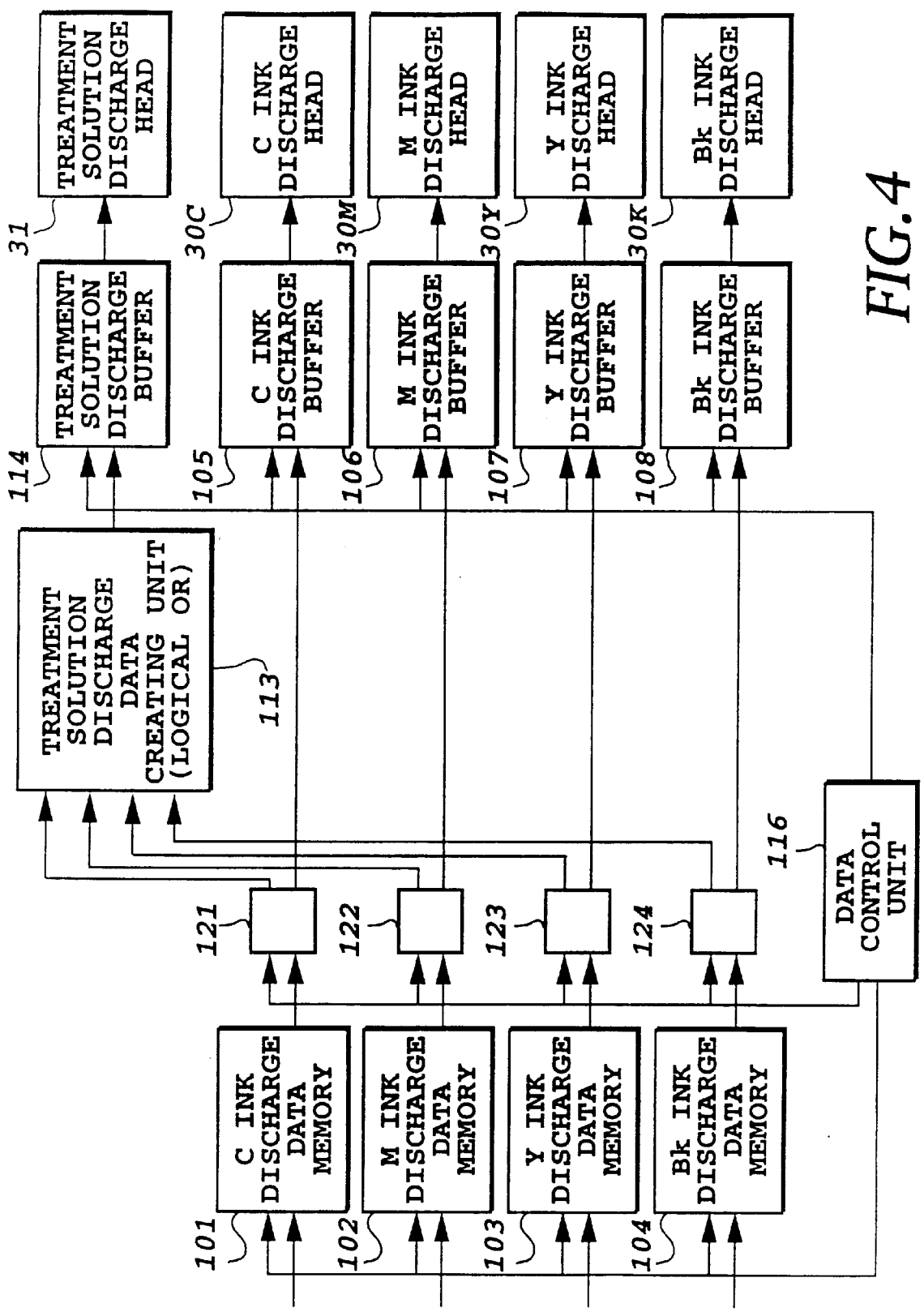
FIG. 4 is a block diagram of the construction for processing discharge data in accordance with a first embodiment of the present invention.
Figure 5B:
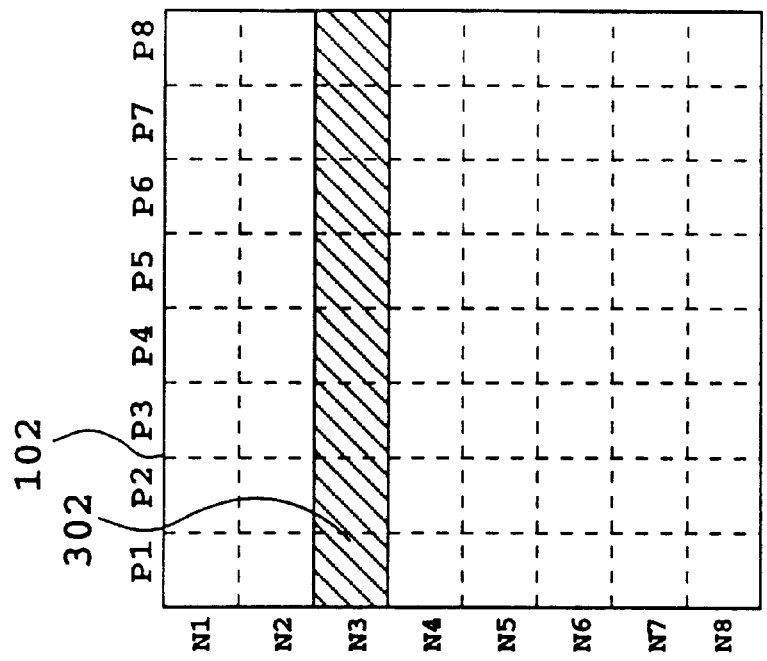
FIGS. 5A to 5D are schematic illustrations of data to be stored in discharge data memories respectively in the above construction.
Figure 5A:
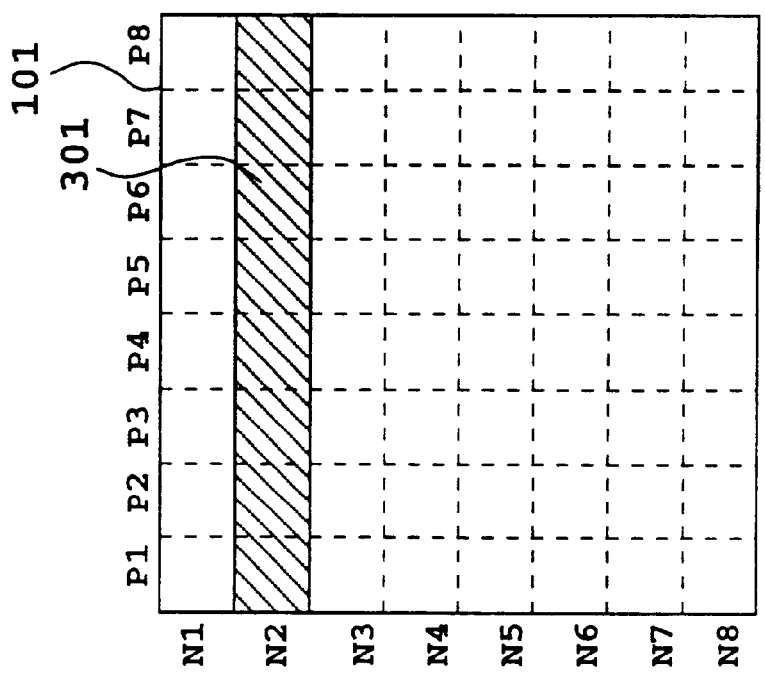
Figure 5D:
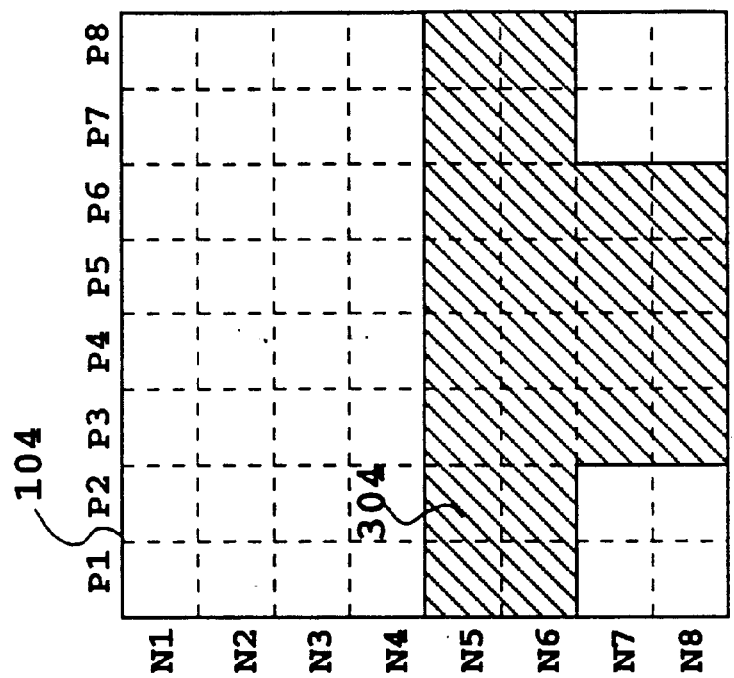
Figure 5C:
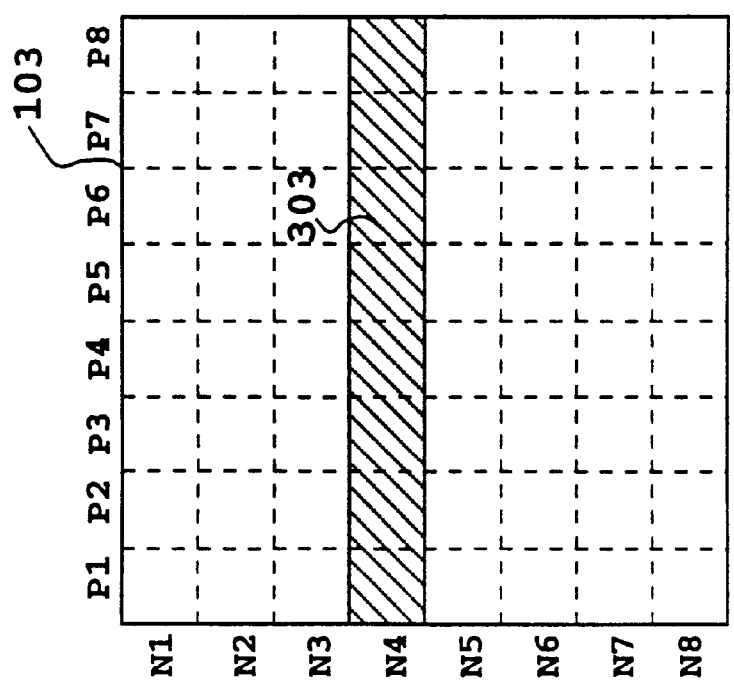

FIG. 4 is a block diagram illustrating the construction for processing discharge data in accordance with the present embodiment.

Print data is converted into discharge data of each C, M, Y, and Bk inks and subsequently stored in discharge data memories 101–104, respectively. Though the amount of data to be stored varies according to specifications of the printing apparatus and the like, it is possible to define the amount of the data so as to correspond to one page or one line. In response to control signals from a data-control unit 116, so far as the number of orifices of each head, the stored data in each memory is read out with a predetermined timing, corresponding to a plurality of orifices of each head. Data-switching units 121–124 corresponding to C, M, Y, and Bk inks respectively are responsible for changing the direction of transmitting the discharge data which is read out of the above respective discharge data memories with the predetermined timing under the control signals from the data control unit 116. This results in data transfers from the respective memories to a data-creating unit or discharge data former 113 for generating data of discharging the treatment solution or to their respective ink-discharge buffers 105–108. That is, respective discharge data of colors, which are first read out of the respective discharge data memories 101–104, are transmitted to the data-creating unit 113 for generating data of discharging the treatment solution, by means of their respective switching circuits 121–124. Then the data-creating unit 113 generates the treatment solution discharge data by performing a logical OR of the respective ink discharge data, followed by storing the generated data in a data buffer for the treatment solution. Then the control signals from the control unit 116 compel the discharge data memories 101–104 to output discharge data so as to also correspond to the number of the orifices of the respective heads, followed by storing the discharge data in the respective ink discharge buffers 105–108.

In the manner described above, the data of discharging the treatment solution and ink of colors are read out and stored in the buffer 114 and the buffers 105–108, respectively so as to correspond to the number of the orifices of the respective heads. Then the heads 31, 30C, 30M, 30Y, and 30K receive the respective discharge data according to their individual discharge timing and discharge the treatment solution and the color ink respectively.

FIGS. 5 to 7 are schematic diagrams for concretely explaining the above discharge data processing. FIGS. 5A to 5D illustrate the discharge data of one line to be stored in the discharge data memories 101–104, respectively. FIGS. 6A to 6H illustrate the condition of the discharge data of one line shown in FIG. 5, in which the discharge data is stored in the discharge buffers 114 and 105–108, respectively. FIGS. 7A to 7H illustrate dot patterns of the treatment solution and the color ink printed on the print medium according to the discharge data of FIG. 6, respectively. In these figures, in addition, N1–N8 denote the positions of storing the data or the positions of forming the dots, which correspond to eight orifices of each head. Furthermore, P1–P8 denote the positions of storing the data or the positions of forming the dots, which correspond to eight discharge positions in the main-scanning direction. The eight discharge positions are chosen for the reason of simplifying the explanation in the same way as that of the orifices.

As shown in FIGS. 5A to 5D, in an image of this concrete example, the C head 30C (data of the memory 101) is the data (301) of drawing a straight line in the main-scanning direction by using the orifice N2 alone. Similarly, the M head 30M (the memory 102) and the Y head 30Y (the memory 103) are the data of drawing straight lines in the main-scanning direction by using the orifices N3 and N4, respectively. In addition, the discharge data stored in the K head 30K (the memory 104) is of drawing a T-shape image by using the orifices N5–N8.

Figure 6A:
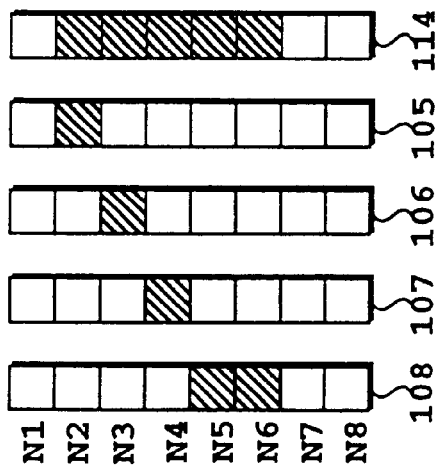
FIGS. 6A to 6H are schematic illustrations of data to be stored in discharge buffers respectively for every discharge position in the above construction.
Figure 6B:
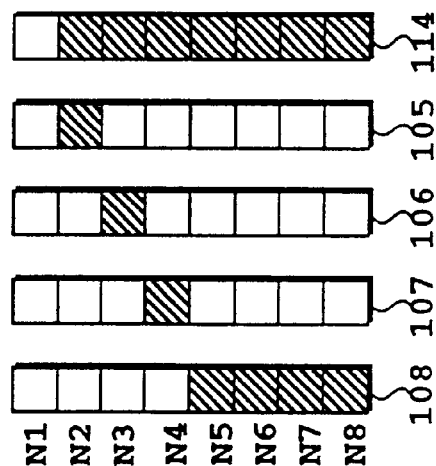
Figure 6C:
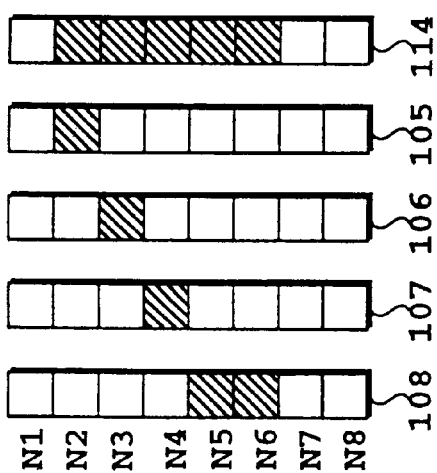
Figure 6D:
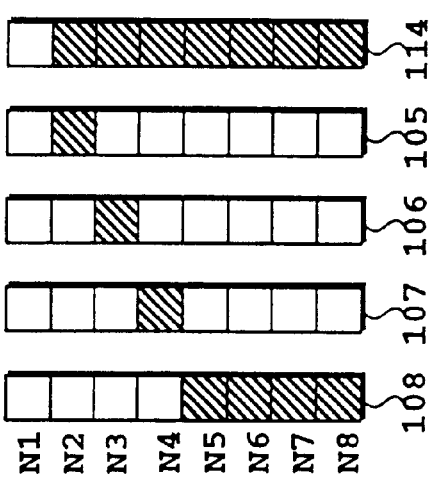
Figure 6E:
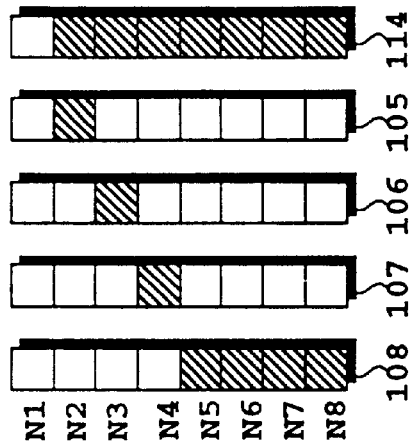
Figure 6F:
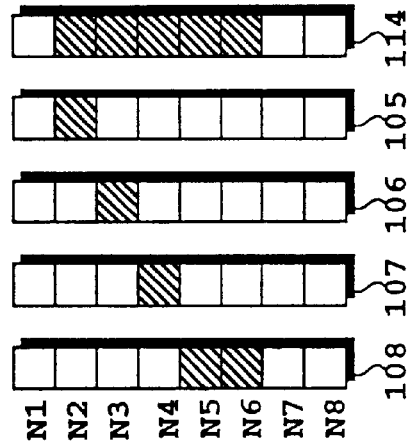
Figure 6G:
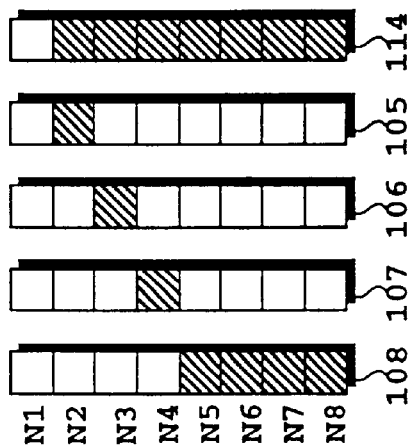
Figure 6H:
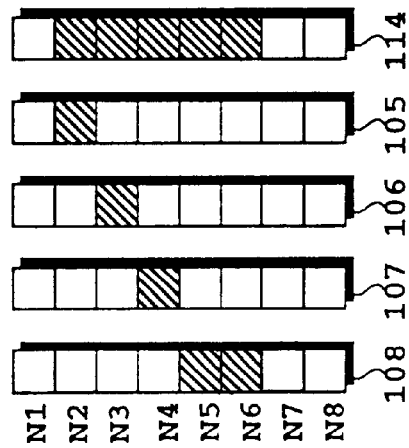

The discharge data of color ink in FIG. 5 are stored in the respective discharge buffers 114 and 105–108 by performing the data transmission including a transmission switching for every discharge, resulting in the condition shown in FIGS. 6A to 6H respectively. That is, FIG. 6A shows the condition of storing the discharge data in each buffer at the time of discharging on the discharge position P1. Similarly, FIGS. 6B to 6H show the conditions of storing the discharge data in each buffer at the time of discharging on the discharge positions P2–P8, respectively.

At the discharge position PI, for example, the data "1" (discharge) is only applied on orifices N2–N6 of the head 31 for discharging the treatment solution because of a logical OR of the discharge data of the heads for discharging the color ink. That is, as shown in FIGS. 5A to 5D, the data "1" is applied on orifice N2 of the C head (the memory 101), orifice N3 of the M head (the memory 102), orifice N4 of the Y head (the memory 103), and orifices N5 and N6 of the K head (the memory 104).

Figure 7A:
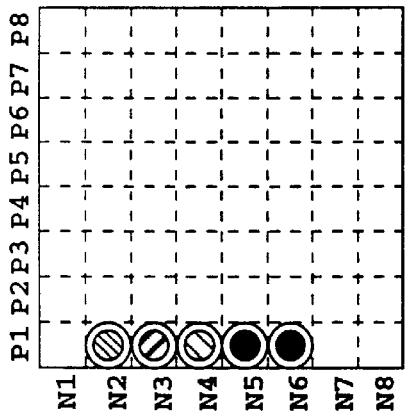
FIGS. 7A to 7H are schematic illustrations of printing results represented by ink dots according to the discharge data shown in FIGS. 6A to 6H, respectively.
Figure 7B:
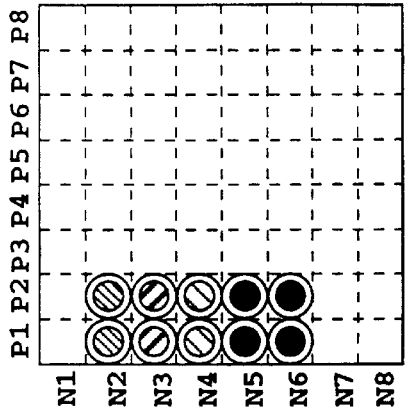
Figure 7C:
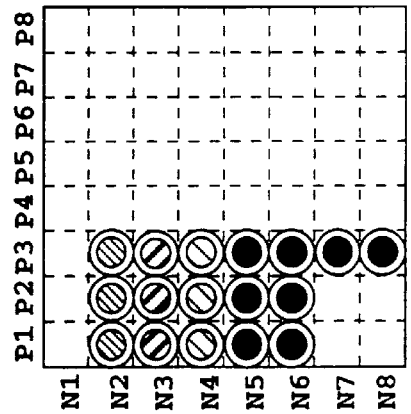
Figure 7D:
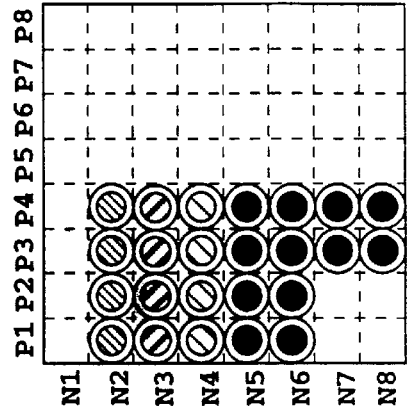
Figure 7E:
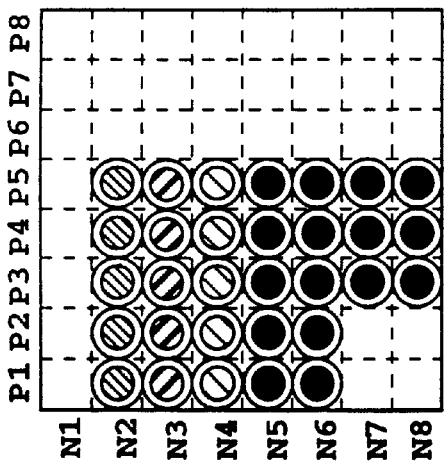
Figure 7F:
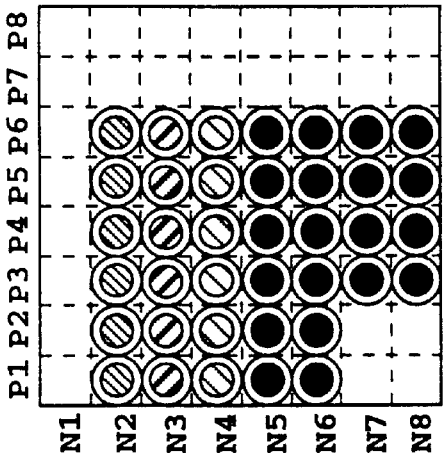
Figure 7G:
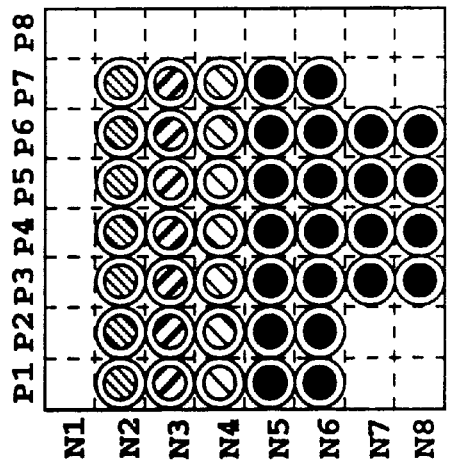
Figure 7H:
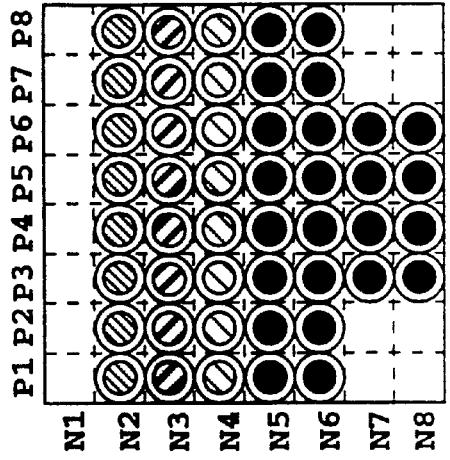

FIGS. 7A to 7H show the results of printing based on the discharge data of the buffers 114 and 105–108 shown in FIG. 6, respectively. For example, FIG. 7A illustrates the result of printing at the discharge position P1, in which each dot formed is based on the discharge data in FIG. 6A. That is, the dot of each ink is discharged so as to be placed on a dot of the treatment solution. In the figure, "O" is the symbol for the dot of the treatment solution. For only the purpose of clarifying the graphical representation, the dots of color ink are represented as the smaller one compared with that of the treatment solution. By the way, it is noted that a size of the dot is not limited by the graphic representation.

By switching the data transmission of the above embodiment, the amount of the discharge data may be only used as much as the number of the orifices of each head, for the buffets of discharging the treatment solution and the color ink. Consequently the ink-jet printing apparatus prints an image with good qualities by using both the ink and the treatment solution without substantially increasing the amount of memories.

<Embodiment 2>

Figure 8:
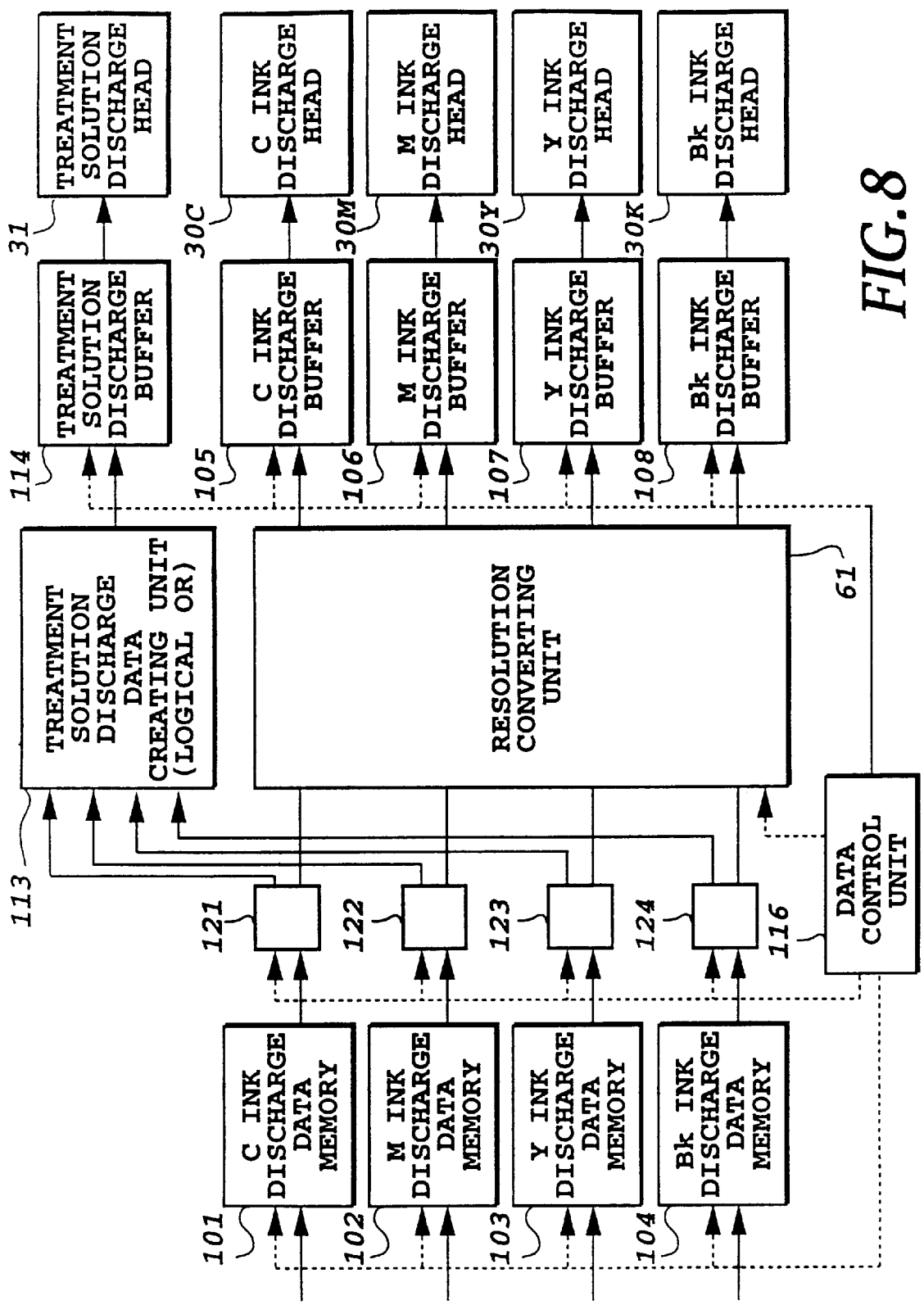
FIG. 8 is a schematic block diagram of the construction for processing the discharge data in accordance with a second embodiment of the present invention.

FIG. 8 is a block diagram illustrating the construction for processing discharge data in accordance with the second embodiment of the present invention.

In this embodiment, the construction of the present invention is adapted to a color ink-jet printing apparatus that performs the printing with the conversion of print data into one with a comparatively high resolution. That is, the construction shown in FIG. 8 comprises almost the same elements as that of the construction shown in FIG. 4 except that the former comprises a resolution-converting unit and uses a discharge head with a resolution of large dpi (dots per inch) at least as an ink discharge head.

Figure 9:
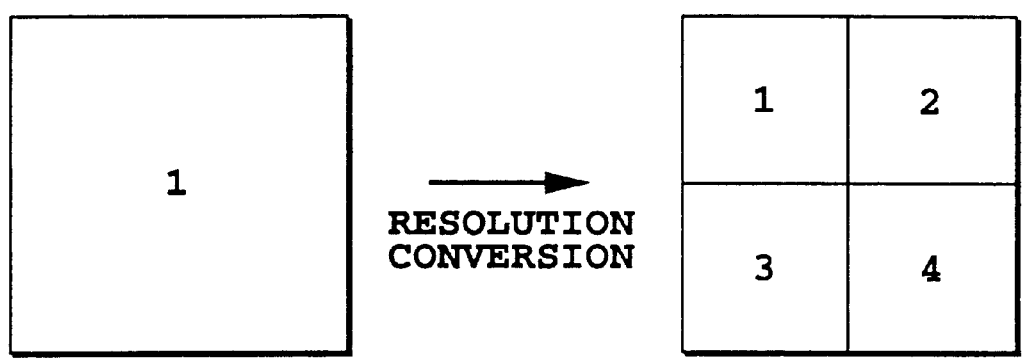
FIG. 9 is a schematic representation of converting a resolution in accordance with the second embodiment.

As shown FIG. 8, that is, respective discharge data of colors are stored in the respective buffers 105–108 after converting the resolution thereof in the resolution-converting unit 61. As a result, the density of the discharge data is increased. In the resolution conversion, as shown in FIG. 9, the resolution-converting unit 61 converts the original discharge data into a doubled density form, in which the density of the data is doubled vertically and horizontally (i.e., in the main-scanning direction). In this embodiment, therefore, images are printed with higher definition. For example the resolution-converting unit 61 increases the amount of the discharge data by four times by converting the discharge data of a resolution of 300×300 (dpi) into that of 600×600 (dpi). In this case, furthermore, the treatment solution discharge data is not subjected to the resolution conversion, so that the amount thereof is lower than that of each ink. Consequently, the amount of the treatment solution to be discharged should be larger than that of each ink so as to form a dot having a larger diameter. To this end, it may be carried out by using an exclusive head for discharging the treatment solution, in which the amount of the solution to be discharged is larger than that of each ink; or conducting the process of increasing a heat pulse that drives the treatment solution discharge head. Consequently, it makes sure that the treatment solution is mixed with each ink.

Figure 11A:
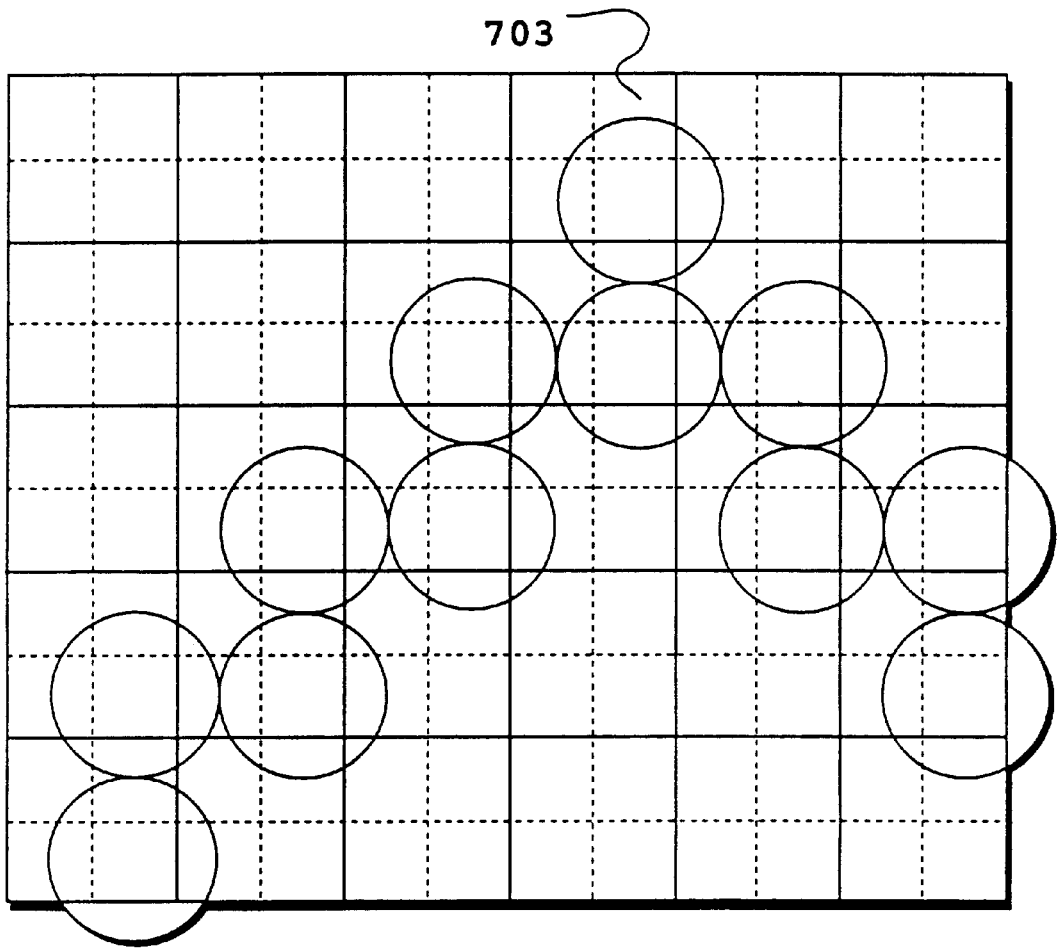
FIGS. 11A and 11B are schematic illustrations of discharge data of treatment solution shown in the above second embodiment and the results thereof with respect to the resolution.
Figure 11B:
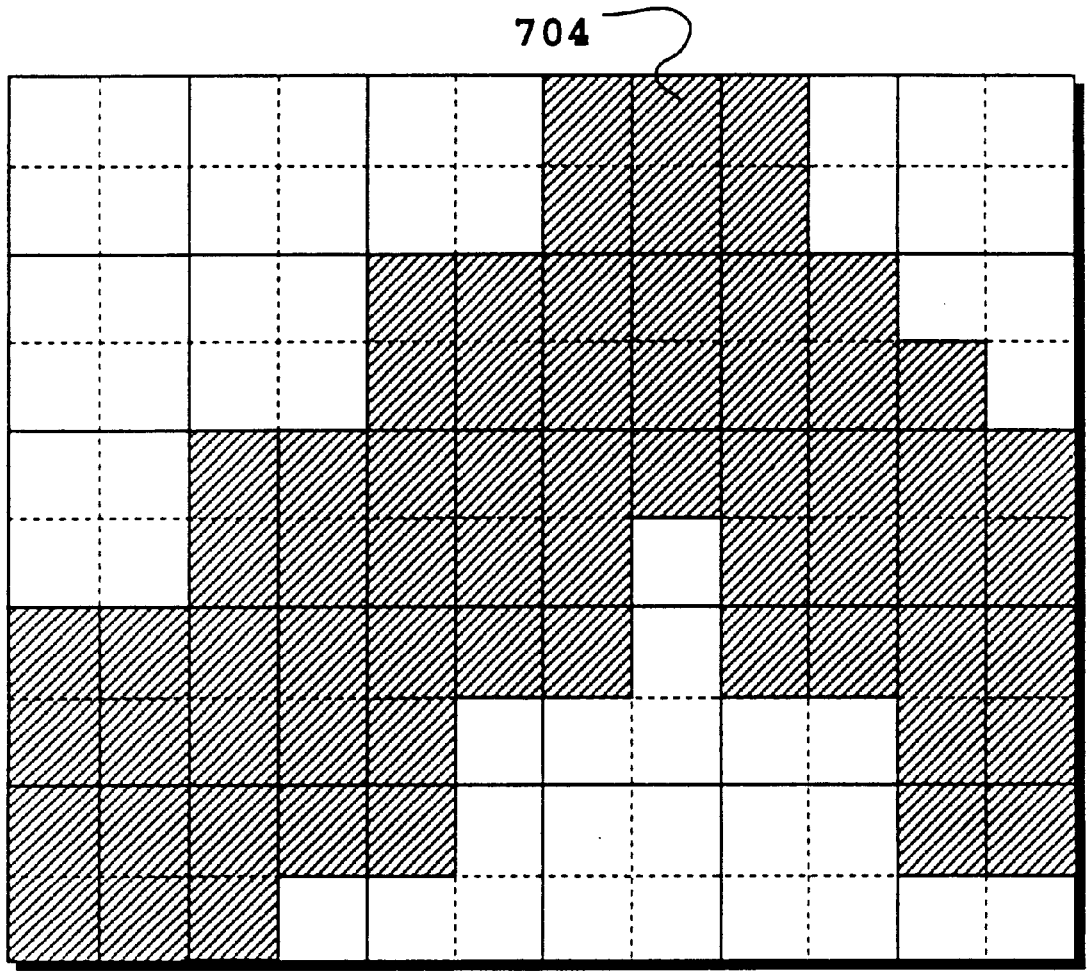
Figure 12:
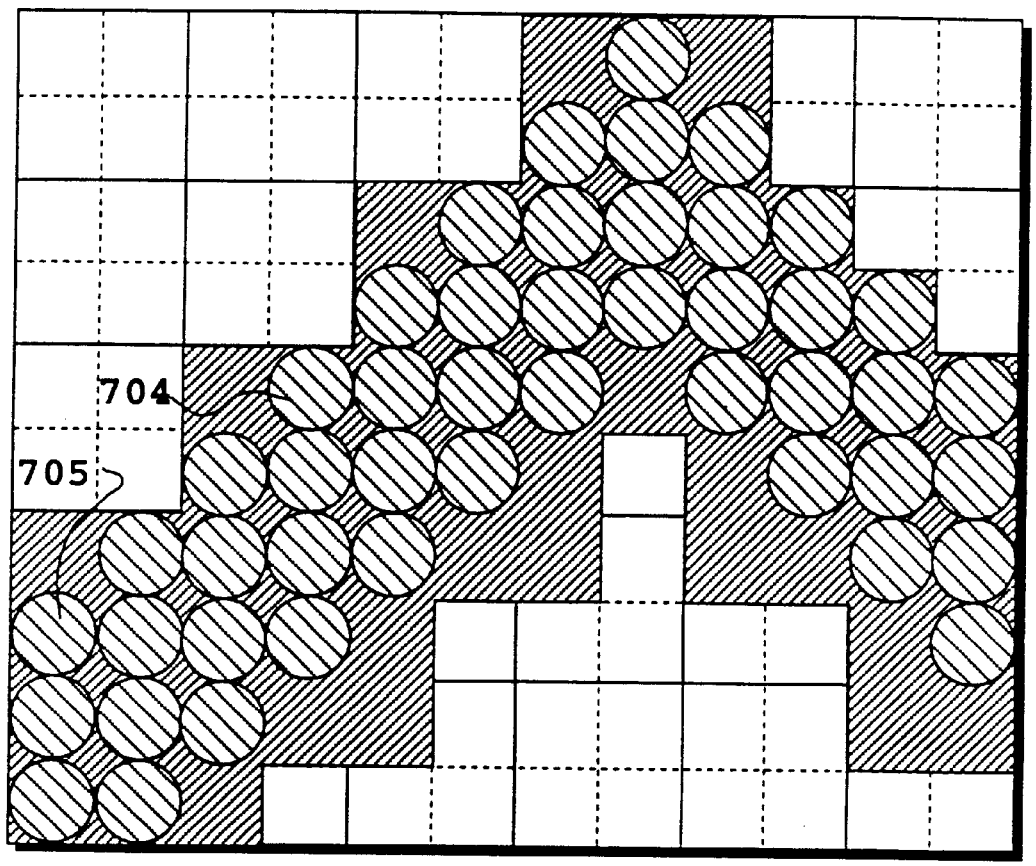
FIG. 12 is a schematic illustration of the relation between the results of discharging the treatment solution shown in FIGS. 11A and 11B and the results of discharging each ink.

FIGS. 10 to 12 are schematic diagrams for illustrating concrete examples of the printing in accordance with the present embodiment. For the purpose of simplifying the explanation, we will describe the case that only the discharge data of black ink is in existence.

Figure 10A:
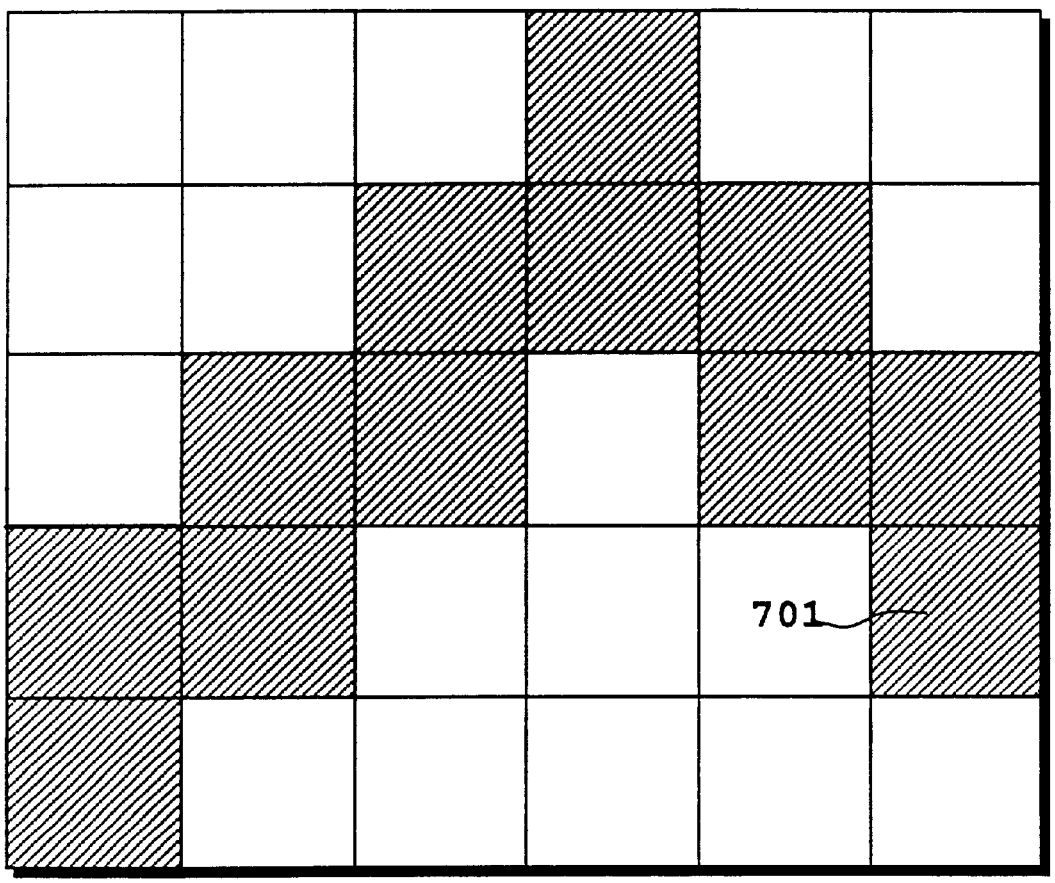
FIGS. 10A and 10B are schematic illustrations of discharge data before and after the resolution conversion, respectively.
Figure 10B:
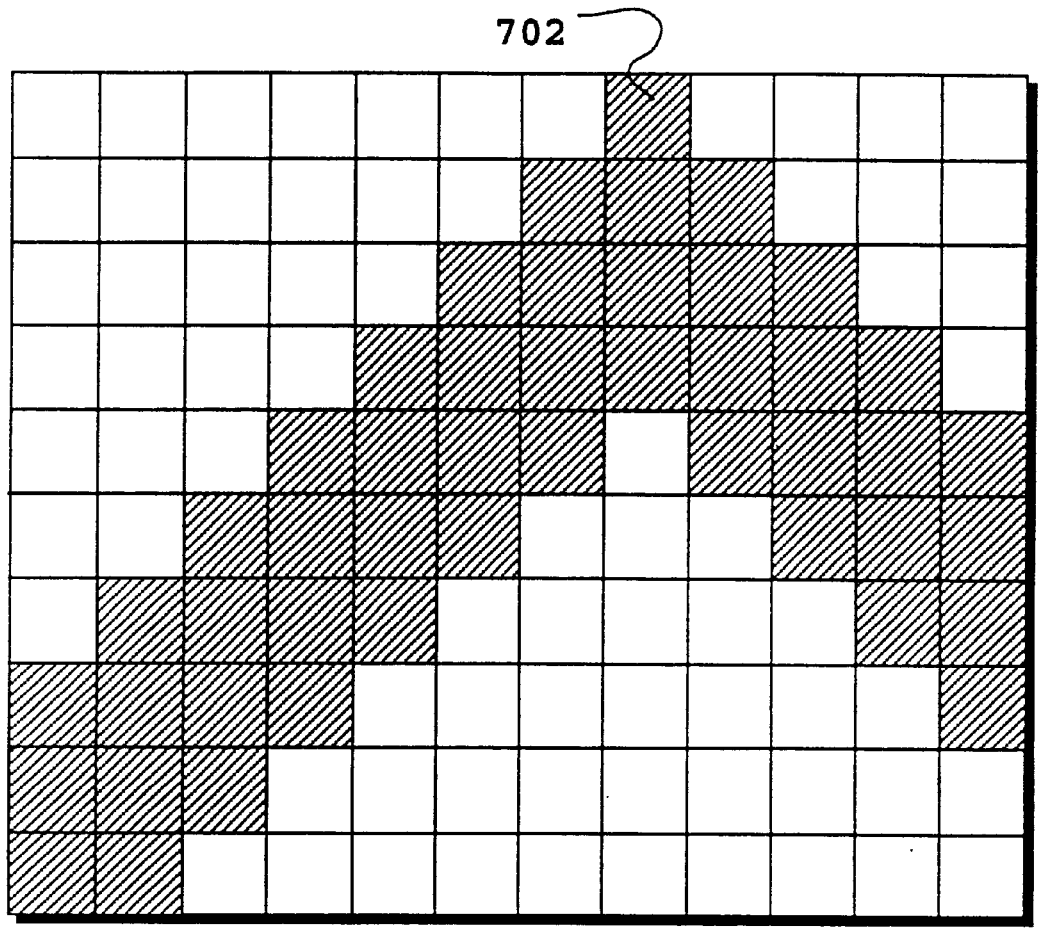

FIG. 10A shows an example of the discharge data of black ink to be stored in the discharge data memory 104. In the figure, reference numeral 701 denotes each discharge position based on that data. In FIG. 10B, furthermore, there is shown modified discharge data obtained by converting the resolution of the discharge data of FIG. 10A. In this case, the modified discharge data is successively stored in the buffer 108 so far as the number of the orifices of the head. In the figure, reference numeral 702 denotes each discharge position based on that data.

Referring now to FIG. 11A, there is shown a schematic diagram of the results of discharging the treatment solution according to the above data. As described above, the discharge data of the treatment solution is generally obtained by a logical OR of the discharge data of the whole color ink with every discharge position. In this example, however, the discharge data of the treatment solution is similar to that of the black ink without the resolution conversion. In addition, a dot of the treatment solution has a larger diameter compared with that of each ink as described above. Furthermore, as the amount of data with respect to the treatment solution are small, the head for the treatment solution discharges if the discharge data exist on any one of pixels represented by reference numerals 1–4 in FIG. 9.

FIG. 11B is a schematic diagram that shows the extent over which the treatment solution discharged as shown in FIG. 11A has an effect on. In the figure, reference numeral 704 denotes the extent over which the treatment solution has an effect on.

Also, FIG. 12 is a schematic diagram that illustrates an appearance of Bk ink in the extent of the treatment solution by discharging the Bk ink according to the discharge data after converting a resolution thereof. In the figure, reference numeral 705 denotes a dot of the Bk ink.

In this embodiment, the treatment solution effects on whole ink dots. If the printing is performed by using different discharge data, the device copes with the different data by making a dot size of the treatment solution larger than that of the ink because there is no substantial change in discharge position.

<Embodiment 3>

In the above embodiment 2, the discharge data of each ink is converted into one having higher resolution and the amount of discharging the treatment solution is comparatively larger than that of the ink. In this embodiment 3, the resolution conversion is performed on each ink but every dot is printed in the same dot size. For this kind of the printing, the construction is shown in FIG. 13.

Figure 13:
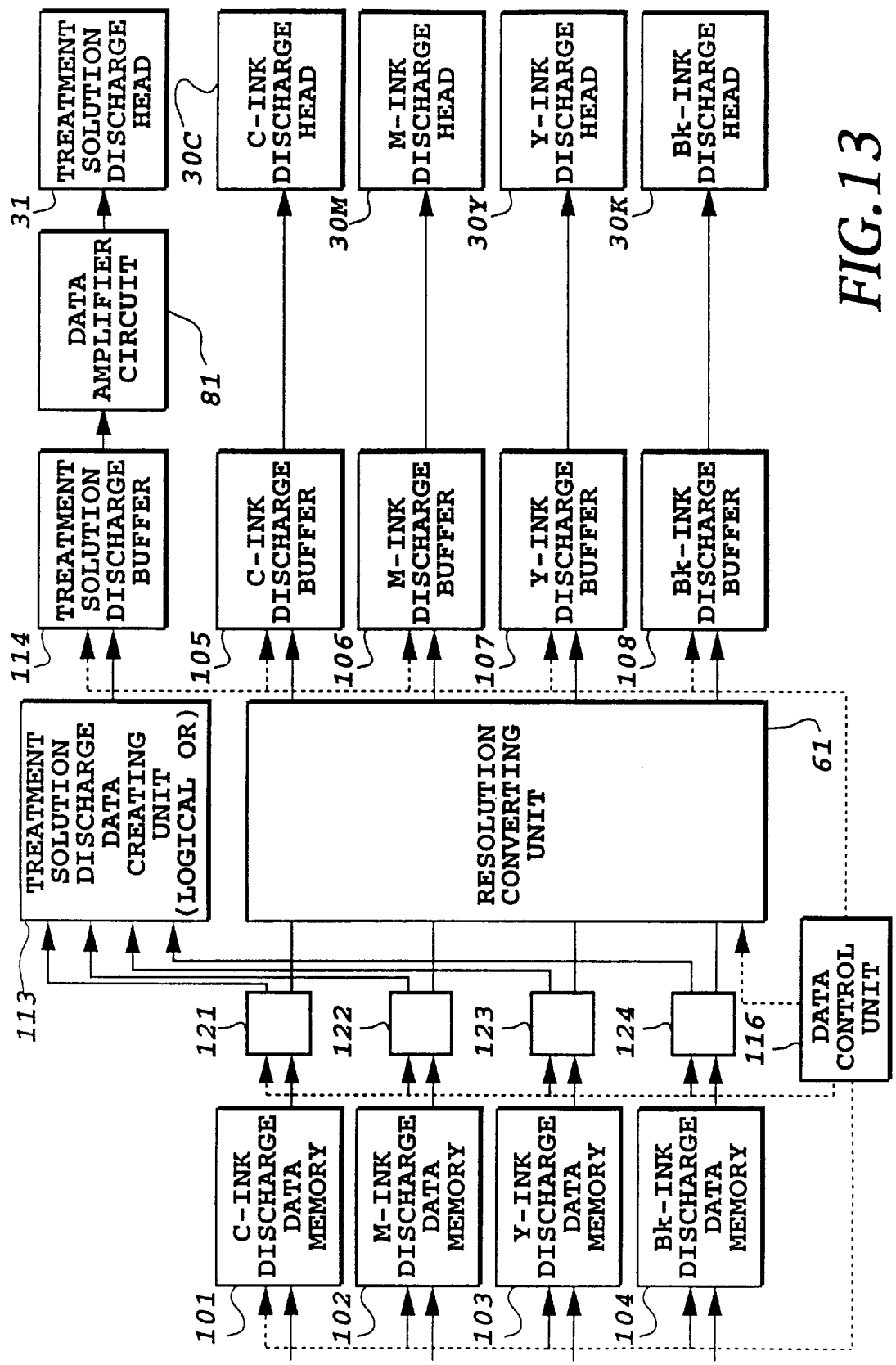
FIG. 13 is a block diagram of the construction for processing discharge data in accordance with a third embodiment of the present invention.

In FIG. 13, the construction is almost the same as that of the embodiment 2 except for the following. In FIG. 13, when the discharge data is transmitted from the treatment solution discharge buffer 114, the discharge data of the treatment solution is transmitted by means of a data amplifier circuit 81 to a plurality of heads, which number depends on a ratio of the resolution conversion, so as to make the discharge data of the treatment solution and the discharge data of each ink in the same resolution, resulting in the treatment solution being discharged with the same resolution as each ink. That is, the present embodiment is constructed so as to discharge the treatment solution from two heads by displacing an array of orifices of one head ½ pitch in its array direction from another one. Furthermore, it is also possible to use only one treatment discharge head having two arrays of orifices ½ pitch deviated from each other.

Figure 14A:
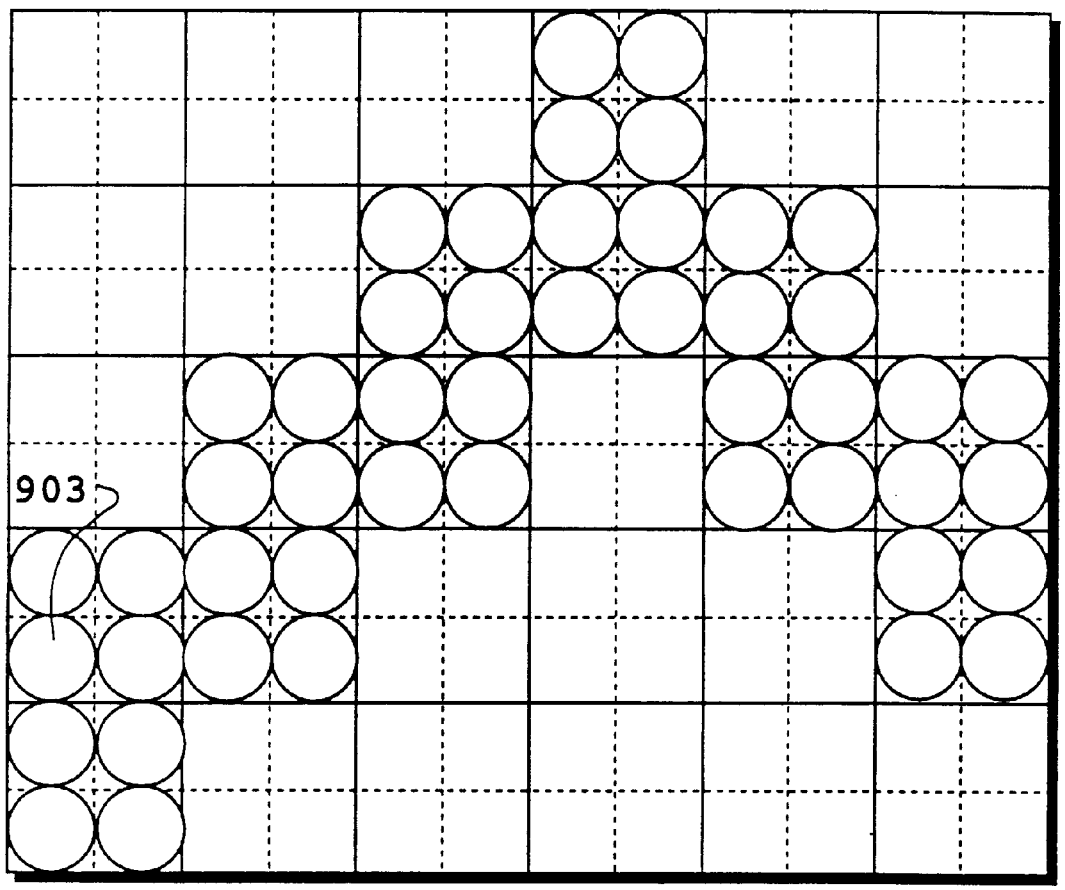
FIGS. 14A and 14B are schematic illustrations of discharge data of treatment solution shown in the above second embodiment and the results thereof with respect to the discharge data of each ink.

Referring now to FIG. 14A, there is shown a schematic diagram illustrating the condition of discharging the treatment solution on the basis of the discharge data (i.e., one obtained by amplification) shown in FIG. 10A.

In the figure, reference numeral 903 denotes one discharge data of the treatment solution. At this time, the amount of discharging the treatment solution and that of each ink may be the same.

Figure 14B:
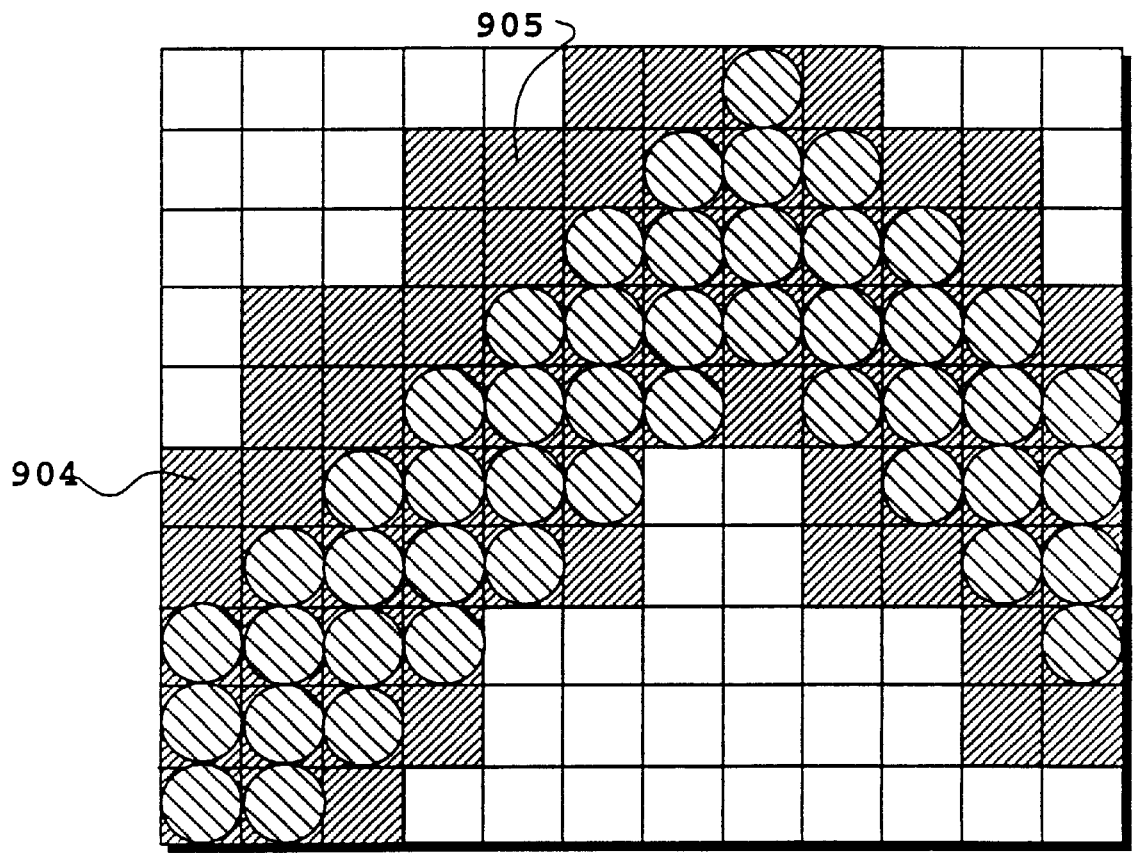

Referring now to FIG. 14B, furthermore, there is shown a schematic diagram illustrating the condition of discharging the ink after discharging the treatment solution. As shown in FIG. 14A, each dot of the treatment solution is of course formed on a position shifted from the corresponding position of each ink dot as a result of just increasing the number of treatment solution's dots on the base of the discharge data before the resolution conversion. As shown in FIG. 14B, however, the effective region of the discharge treatment solution is not always in its landed area. It also can be observed in the adjacent area. Furthermore, in the case of ink dots obtained by the resolution-converted discharge data, an effectiveness of the treatment solution can be observed on every position. Consequently, it is proved that the present embodiment makes the effective use of the treatment solution, so that the printing with a high quality and a high water-resistibility can be performed.

Ink usable for carrying out the present invention should not be limited only to dyestuff ink; and pigment ink having pigment dispersed therein can also be used. Any type of treatment liquid can be used, provided that pigment is aggregated with it. The following pigment ink can be noted as an example of pigment ink adapted to cause aggregation by mixing with the treatment liquid A1 previously discussed. As mentioned below, yellow ink Y2, magenta ink M2, cyan ink C2 and black ink K2 each containing pigment and anionic compound can be obtained.

[Black Ink K2]

The following materials are poured in a batch type vertical sand mill (manufactured by Aimex Co.), glass beads each having a diameter of 1 mm are filled as media using anion based high molecular weight material P-1 (aqueous solution containing a solid ingredient of styrene methacrylic acid ethylacrylate of 20% having an acid value of 400 and average molecular weight of 6000, neutralizing agent: potassium hydroxide) as dispersing agent to conduct dispersion treatment for three hours while water-cooling the sand mill. After completion of dispersion, the resultant mixture has a viscosity of 9 cps and pH of 10.0. The dispersing liquid is poured in a centrifugal separator to remove coarse particles, and a carbon black dispersing element having a weight-average grain size of 10 nm is produced.

| (Composition of carbon black dispersing element) | |
|---|---|
| P-1 aqueous solution (solid ingredient of 20%) | 40 parts |
| carbon black Mogul L (manufactured by Cablack Co.) | 24 parts |
| glycerin | 15 parts |
| ethylene glycol monobutyl ether | 0.5 parts |
| isopropyl alcohol | 3 parts |
| water | 135 parts |

Next, the thus obtained dispersing element is sufficiently dispersed in water, and black ink K2 containing pigment for ink jet printing is obtained. The final product has a solid ingredient of about 10%.

[Yellow Ink Y2]

Anionic high molecular P-2 (aqueous solution containing a solid ingredient of 20% of stylen-acrlylic acid methyl methaacrylate having an acid value of 280 and an average molecular weight of 11,000, neutralizing agent: diethanolamine) is used as a dispersing agent and dispersive treatment is conducted in the same manner as production of the black ink K2 whereby yellow color dispersing element having a weight-average grain size of 103 nm is produced.

| (composition of yellow dispersing element) | |
|---|---|
| P-2 aqueous solution (having a solid ingredient of 20%) | 35 parts |
| C. I. pigment yellow 180 (tradename: Nobapalm yellow PH-G, manufactured by Hext Co.) | 24 parts |
| triethylen glycol | 10 parts |
| diethylenglycol | 10 parts |
| ethylene glycol monobutylether | 1.0 parts |
| isopropyl alcohol | 0.5 parts |
| water | 135 parts |

The thus obtained yellow dispersing element is sufficiently dispersed in water to obtain yellow ink Y2 for ink jet printing and having pigment contained therein. The final product of ink contains a solid ingredient of about 10%.

[Cyan Ink C2]

Cyan colored-dispersant element having a weight-average grain size of 120 nm is produced using anionic high molecular P-1 as dispersing agent, and moreover, using the following materials by conducting dispersing treatment in the same manner as the carbon black dispersing element.

| (composition of cyan colored-dispersing element) | |
|---|---|
| P-1 aqueous solution (having solid ingredient of 20%) | 30 parts |
| C. I. pigment blue 153 (trade name: Fastogen blue FGF, manufactured by Dainippon Ink And Chemicals, Inc.) | 24 parts |
| glycerin | 15 parts |
| diethylenglycol monobutylether | 0.5 parts |
| isopropyl alcohol | 3 parts |
| water | 135 parts |

The thus obtained cyan colored dispersing element is sufficiently stirred to obtain cyan ink C2 for ink jet printing and having pigment contained therein. The final product of ink has a solid ingredient of about 9.6%.

[Magenta Ink M2]

Magenta color dispersing element having a weight-average grain size of 115 nm is produced by using the anionic high molecular P-1 used when producing the black ink K2 as dispersing agent, and moreover, using the following materials in the same manner as that in the case of the carbon black dispersing agent.

| (composition of the magenta colored dispersing element) | |
|---|---|
| P-1 aqueous solution (having a solid ingredient of 20%) | 20 parts |
| C. I. pigment red 122 (manufactured by Dainippon Ink And Chemicals, Inc.) | 24 parts |
| glycerin | 15 parts |
| isopropyl alcohol | 3 parts |
| water | 135 parts |

Magenta ink M2 for ink jet printing and having pigment contained therein is obtained by sufficiently dispersing the magenta colored dispersing element in water. The final product of ink has a solid ingredient of about 9.2%.

The present invention achieves distinct effect when applied to a recording head or a recording apparatus which has means for generating thermal energy such as electrothermal transducers or laser light, and which causes changes in ink by the thermal energy so as to discharge or eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

Figure 15:
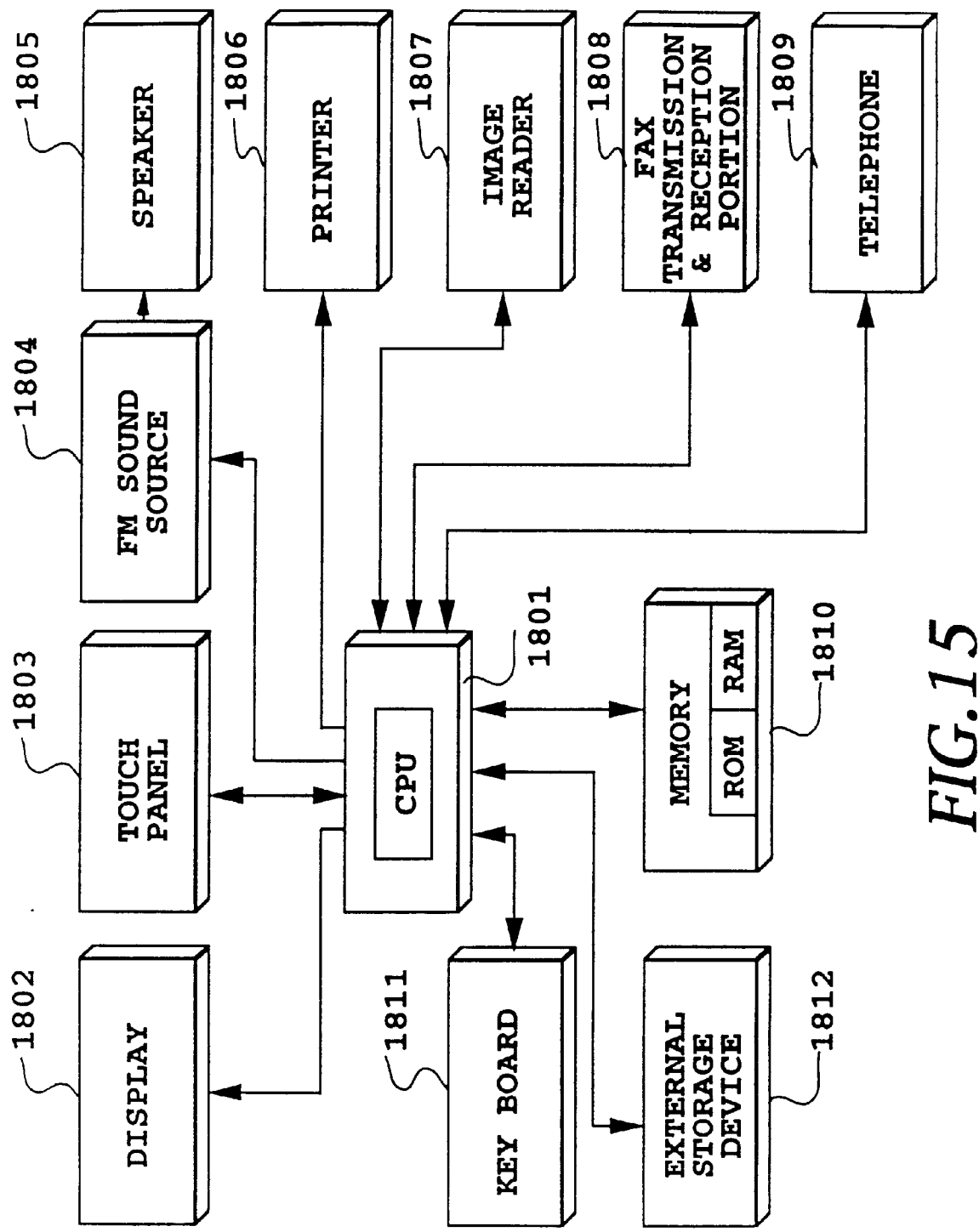
FIG. 15 is a block diagram illustrating one embodiment of an information processing system that uses the ink-jet printing apparatus of one of the above embodiments of the present invention.

FIG. 15 is a block diagram showing general construction of an information processing apparatus having a function of wordprocessor, personal computer, facsimile machine, a copy machine and so forth, to which the printing apparatus according to the present invention is applied.

In the figure, reference numeral 1801 denotes a control portion performing control of the overall apparatus, which includes CPU, such as microprocessor and so forth, and various I/O ports, to perform control for outputting control signal or data signal and so forth to respective portions and inputting control signal or data signal from the respective portions. Reference numeral 1802 denotes a display portion having a display screen, on which various menus, document information and images or so forth read by an image reader 1807 are displayed. Reference numeral 1803 denotes a transparent pressure sensitive touch panel provided on the display portion 1802 for performing item entry or coordinate portion entry on the display portion 1802 by depressing the surface thereof by a finger or so forth.

Reference numeral 1804 denotes an FM (frequency modulation) sound source portion which stores music information produced by a music editor and so forth in a memory portion 1810 or an external memory 1812 and performs FM modulation by reading out the stored music information from the memory portion or so forth. An electric signal from the FM sound source portion 1804 is transformed into an audible sound by a speaker portion 1805. A printer portion 1806 is employed as an output terminal of the wordprocessor, the personal computer, the facsimile machine, the copy machine and so forth, in which the printing apparatus according to the present invention is applied.

Reference numeral 1807 denotes an image reader portion for optoelectrically reading out an original data for inputting, which is located at the intermediate position in an original feeding path and performs reading out various original documents, such as original document for facsimile machine or copy machine. Reference numeral 1808 denotes a facsimile (FAX) transmission and reception portion for transmitting original data read by the image reader portion or for receiving transmitted facsimile signal, which facsimile transmission and reception portion has an external interface function. Reference numeral 1809 denotes a telephone machine portion having a normal telephone function and various associated functions, such as a recording telephone and so forth.

Reference numeral 1810 denotes a memory portion including a ROM storing a system program, a manager program, other application programs and so forth, as well as character fonts, dictionary and so forth, a RAM for storing application program loaded from an external storage device 1812, document information, video information and so forth.

Reference numeral 1811 denotes a keyboard portion inputting document information or various commands. Reference numeral 1812 denotes the external storage device employing a floppy disk or hard disk drive as storage medium. In the external storage device 1812, document information, music or speech information, application programs of the user and so forth are stored.

Figure 16:
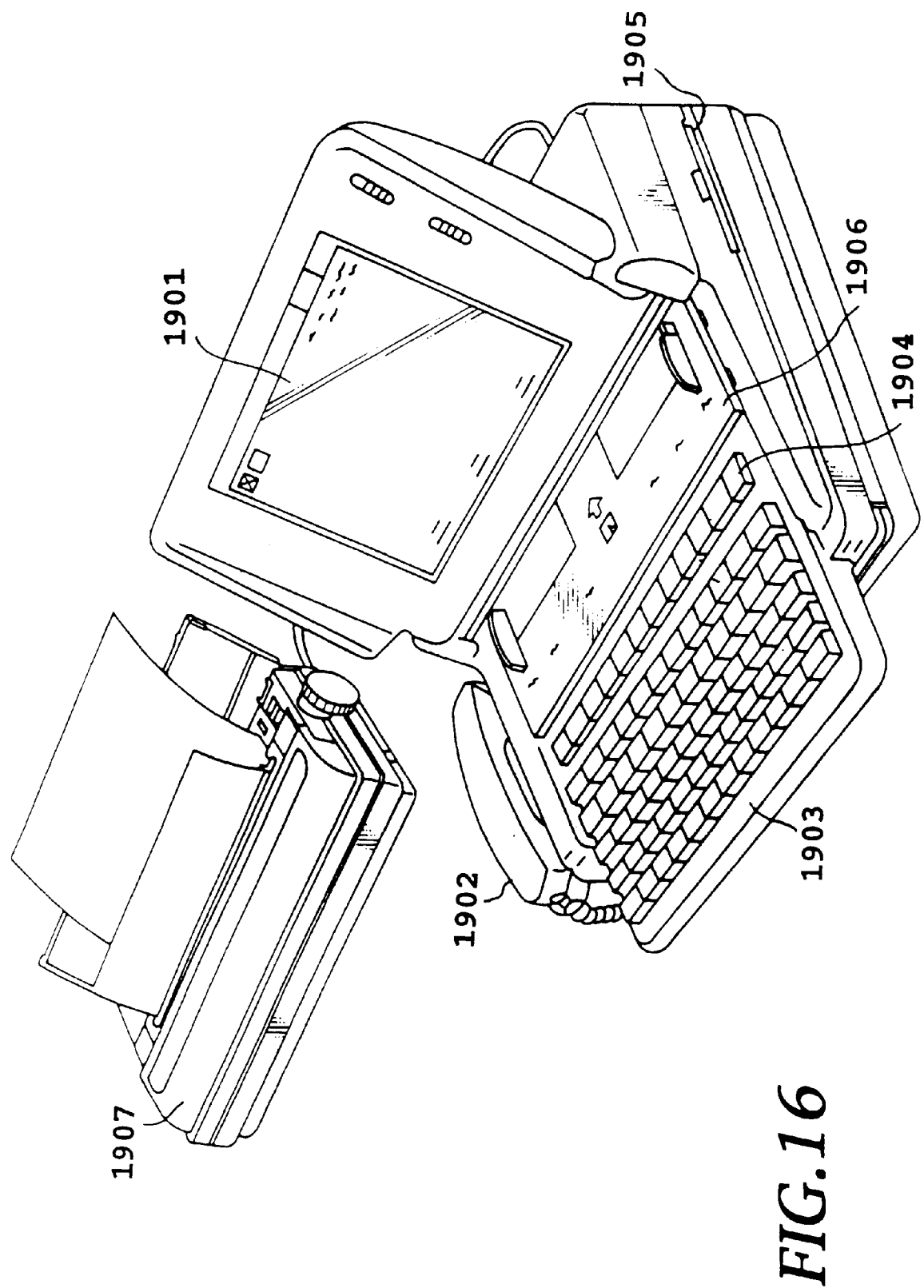
FIG. 16 is an external perspective view of the above system.

FIG. 16 is a diagrammatic external view of the information processing system shown in FIG. 15.

In FIG. 16, reference numeral 1901 denotes a flat panel display utilizing a liquid crystal and so forth. On this display, the touch panel 1803 is overlaid so that coordinate position input or item designation input can be performed by depressing the surface of the touch panel 1803 by a finger or so forth. Reference numeral 1902 denotes a handset to be used when a function as the telephone machine of the apparatus is used. A keyboard is detachably connected to a main body of the apparatus through a cable and adapted to permit entry of various document information or various data input. On the other hand, on the keyboard 1903, various function keys and so forth are arranged. Reference numeral 1905 denotes an insertion mouth of the external storage device 1812 for accommodating a floppy disk inserted thereinto.

Reference numeral 1906 denotes a paper stacking portion for stacking the original to be read by the image reader portion 1807. The original read by the image reader portion is discharged from the back portion of the apparatus. On the other hand, in facsimile reception, the received information is printed by the ink-jet printer 1907.

It should be noted that while the display portion 1802 may be a CRT, it is desirable to employ a flat display panel, such as a liquid crystal display employing a ferrodielectric liquid crystal for capability of down-sizing and reduction of thickness as well as reduction of weight.

When the information processing apparatus as set forth is operated as the personal computer or the wordprocessor, various information input through the keyboard portion 1811 is processed according to a predetermined program by the control portion 1801 and output as printed image by the printer portion 1806.

When the information processing apparatus is operated as a receiver of the facsimile machine, facsimile information input from the FAX transmission and reception portion 1808 via a communication network is subject to reception process according to the predetermined program and output as received image by the printer portion 1808.

In addition, when the information processing apparatus is operated as a copy machine, the original is read by the image reader portion 1807 and the read original data is output to the printer portion as copy image via the control portion 1801. It should be noted that, when the information processing apparatus is used as the transmitter of the facsimile machine, the original data read by the image reader 1807 is processed for transmission according to the predetermined program by the control portion, and thereafter transmitted to the communication network via the FAX transmission and reception portion 1808.

Figure 17:
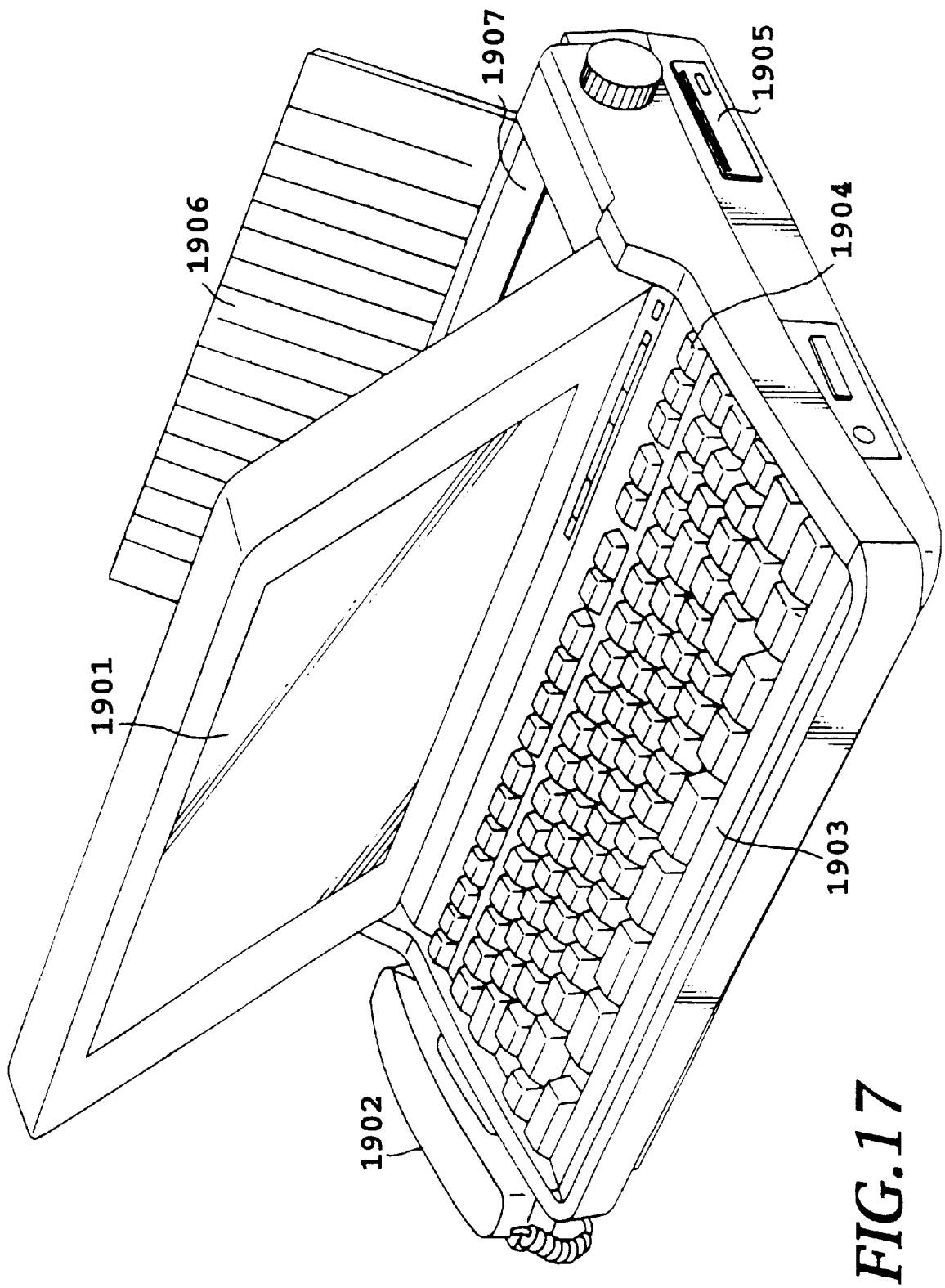
FIG. 17 is an external perspective view of another embodiment of the above system.

It should be noted that the information processing apparatus may be an integrated type incorporating the ink-jet printer within a main body as illustrated in FIG. 17. In this case, portability can be further improved. In FIG. 17, the portions having the same function to FIG. 16 are shown with the corresponding reference numerals.

As set forth above, a multi-function type information processing apparatus may obtain high quality printed image at high speed and low noise by employing the printing apparatus of the present invention. Therefore, the functions of the information processing apparatus can be further enhanced.

What is claimed is:

1. An ink-jet printing apparatus performs a printing process by discharging at least one of a number of separate inks from an ink discharge portion having a plurality of orifices at predetermined orifice positions and discharging a liquid that includes at least a substance making coloring material in said ink insoluble or coherent from a liquid discharge portion onto a printing medium, comprising:

a number of discharge data memories for storing discharge data for the ink discharge portion, the number of discharge data memories being equal to the number of the separate inks;

a discharge data former for forming discharge data of the liquid based on the discharge data stored in said discharge data memories;

a number of ink discharge buffers for storing the ink discharge data for the ink discharge portion transferred from said discharge data memories, the number of said ink discharge buffers being equal to the number of the separate inks;

a liquid discharge buffer for storing the discharge data of the liquid formed by said discharge data former; and a controller for driving the ink discharge portion to discharge ink and the liquid discharge portion to discharge the liquid according to the discharge data stored in said ink discharge buffers and said liquid discharge buffer, respectively, wherein no discharge data memory for storing the discharge data for the liquid is provided and the discharge data for the liquid is formed by said discharge data former in real time based on the discharge data for the ink discharge portion stored in said discharge data memories.

2. An ink-jet printing apparatus as claimed in claim 1, wherein said controller further comprises a resolution converting circuit for converting a resolution of the discharge data transmitted to said ink discharge buffers.

3. An ink-jet printing apparatus as claimed in claim 2, wherein said resolution converting circuit performs a conversion by which a resolution of the discharge data is increased.

4. An ink-jet printing apparatus as claimed in claim 3, wherein said controller further comprises a data-amplification circuit for increasing the amount of the discharge data formed by said discharge data former and transmitting the increased discharge data to said liquid discharge buffer.

5. An ink-jet printing apparatus as claimed in claim 1, wherein said liquid comprises cationic substances of a low-molecular weight ingredient and a high-molecular weight ingredient, while said ink comprises an anionic dyestuff.

6. An ink-jet printing apparatus as claimed in claim 1, wherein said liquid comprises cationic substances of a low-molecular weight ingredient and a high-molecular weight ingredient, while said ink comprises an anionic compound and a pigment.

7. An ink-jet printing apparatus as claimed in claim 1, wherein said ink discharge portion and said liquid discharge portion each comprise a thermal energy generating element for discharging the ink or the liquid by utilizing thermal energy.

8. An apparatus as claimed in claim 1, further comprising means for connecting to a computer.

9. An apparatus as claimed in claim 1, further comprising a reader for effecting copying.

10. An apparatus as claimed in claim 1, further comprising means for transmitting and receiving image signals.

11. An apparatus as claimed in claim 1, wherein said controller comprises a data-transfer switch circuit for switching a transmission of the discharge data stored in said discharge data memory to said discharge data former and said ink discharge buffer.

12. An ink-jet printing apparatus for performing a printing process by discharging at least one of a number of separate inks on a printing medium from a plurality of color ink discharge heads, each having a plurality of orifices at predetermined orifice positions, and discharging a liquid having at least a substance which makes coloring material in the ink insoluble or coherent from at least one liquid discharge head, comprising:

a number of discharge data memory portions for storing discharge data for the plurality of the color ink discharge heads, respectively, the number of discharge data memory portions being equal to the number of the separate inks;

a discharge data former for forming discharge data for said liquid discharge head based on the predetermined amount of discharge data stored in said number of discharge data memory portions;

a liquid discharge buffer for storing the discharge data for the liquid discharge portion formed by said discharge data former;

a number of color ink discharge buffers for storing the discharge data for each of the number of color ink discharge heads, respectively, transferred from said discharge data memory portions, the number of said color ink discharge buffers being equal to the number of the separate inks;

a data-transfer switch for switching a transmission of the discharge data stored in said number of discharge data memory portions to said discharge data former and the respective number of the color ink discharge buffers; and a controller for driving said at least one liquid discharge portion and said plurality of color ink discharge portions according to the discharge data stored in said liquid discharge buffer and said number of color ink discharge buffers, respectively, wherein no discharge data memory portion for storing the discharge data for the liquid is provided and the discharge data for the liquid is formed by said discharge data former in real time based on the discharge data for the color ink discharge heads stored in said discharge data memory portions.

13. An ink-jet printing apparatus as claimed in claim 12, wherein said controller drives said at least one liquid discharge portion and said plurality of color discharge portions at discharge timings and said data transfer switch switches said transmission every discharge timing.

14. An ink-jet printing apparatus as claimed in claim 13, wherein said discharge data former forms discharge data of the liquid by performing a logical OR of the discharge data stored in the number of the discharge data memory portions at every discharge timing.

15. An apparatus as claimed in claim 12, further comprising means for connecting to a computer.

16. An apparatus as claimed in claim 12, further comprising a reader for effecting copying.

17. An apparatus as claimed in claim 12, further comprising means for transmitting and receiving image signals.

18. An ink-jet printing method which performs a printing process by discharging at least one of a number of separate inks and discharging a liquid that includes at least a substance making coloring material in said ink insoluble or coherent, said method comprising the steps of:

providing a number of discharge data memories for storing discharge data for the ink discharge portion, the number of the discharge data memories being equal to the number of the separate inks;

forming discharge data of the liquid based on the discharge data stored in the discharge data memories;

providing a number of ink discharge buffers for storing the ink discharge data for the ink discharge portion transferred from the discharge data memories, the number of the ink discharge buffers being equal to the number of the inks;

providing a liquid discharge buffer for storing the discharge data of the liquid formed in said liquid discharge data forming step; and discharging ink and the liquid according to the discharge data stored in the ink discharge buffers and the liquid discharge buffer, respectively, wherein no discharge data memory for storing discharge data for the liquid is provided and the discharge data of the liquid is formed in said liquid discharge data forming step in real time based on the discharge data for the ink discharge portion stored in the discharge data memories.

* * * * *

UNITED STATES PATENT AND TRADEMARK OFFICE
CERTIFICATE OF CORRECTION

PATENT NO. : 6,095,644

DATED : August 1, 2000

INVENTOR(S) : KASAMATSU ET AL.

It is certified that error appears in the above-identified patent and that said Letters Patent is hereby corrected as shown below:

<u>[56] References Cited</u>:
  FOREIGN PATENT DOCUMENTS, "5202328" should read
--5-202328--.

<u>COLUMN 10</u>:
  Line 2, "buffets" should read --buffers--.

Signed and Sealed this

Seventeenth Day of April, 2001

Attest:

NICHOLAS P. GODICI

Attesting Officer        Acting Director of the United States Patent and Trademark Office